(12) United States Patent
Osada

(10) Patent No.: US 12,176,003 B2
(45) Date of Patent: Dec. 24, 2024

(54) MAGNETIC TAPE CARTRIDGE INCLUDING A STORAGE MEDIUM IN WHICH IDENTIFIER READING CONDITION INFORMATION IS STORED

(71) Applicant: FUJIFILM CORPORATION, Tokyo (JP)

(72) Inventor: Yoshihiko Osada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/172,355

(22) Filed: Feb. 22, 2023

(65) Prior Publication Data

US 2023/0282227 A1 Sep. 7, 2023

(30) Foreign Application Priority Data

Mar. 1, 2022 (JP) ................. 2022-031290

(51) Int. Cl.

| | | |
|---|---|---|
| G11B 23/04 | (2006.01) | |
| G11B 5/008 | (2006.01) | |
| G11B 23/00 | (2006.01) | |
| G11B 7/0045 | (2006.01) | |
| G11B 7/08 | (2006.01) | |
| G11B 7/125 | (2012.01) | |
| G11B 15/68 | (2006.01) | |

(52) U.S. Cl.
CPC ........ *G11B 23/042* (2013.01); *G11B 5/00813* (2013.01); *G11B 23/0057* (2013.01); *G11B 23/045* (2013.01); *G11B 7/0045* (2013.01); *G11B 7/082* (2013.01); *G11B 7/125* (2013.01); *G11B 15/68* (2013.01); *G11B 2220/655* (2013.01); *G11B 2220/80* (2013.01)

(58) Field of Classification Search
None
See application file for complete search history.

(56) References Cited

U.S. PATENT DOCUMENTS

| | | | | |
|---|---|---|---|---|
| 2003/0030926 | A1* | 2/2003 | Aguren et al. ....... | G11B 23/042 360/31 |
| 2005/0230470 | A1 | 10/2005 | Hoshino | |
| 2008/0002273 | A1* | 1/2008 | Fujiwara ................ | G11B 15/07 360/69 |
| 2018/0232619 | A1* | 8/2018 | Kagawa ................. | G06K 19/08 |

FOREIGN PATENT DOCUMENTS

| | | |
|---|---|---|
| JP | 2004-022072 A | 1/2004 |
| JP | 2016-122484 A | 7/2016 |
| WO | 2005/004142 A1 | 1/2005 |

* cited by examiner

*Primary Examiner* — Craig A. Renner
(74) *Attorney, Agent, or Firm* — SOLARIS Intellectual Property Group, PLLC

(57) ABSTRACT

A magnetic tape cartridge includes a case on which an identifier is displayed, and a storage medium in which reading condition information that is information regarding a condition for reading the identifier is stored. The magnetic tape cartridge can be part of a cartridge management system, a reading method, and a non-transitory storage medium storing a program.

15 Claims, 17 Drawing Sheets

MAGNETIC TAPE CARTRIDGE INCLUDING A STORAGE MEDIUM IN WHICH IDENTIFIER READING CONDITION INFORMATION IS STORED

CROSS-REFERENCE TO RELATED APPLICATION

This application claims priority from Japanese Patent Application No. 2022-031290, filed Mar. 1, 2022, the disclosure of which is incorporated herein by reference in its entirety.

BACKGROUND

Technical Field

A technique of the present disclosure relates to a magnetic tape cartridge, a cartridge management system, a reading method, and a non-transitory storage medium storing a program.

Related Art

JP2016-122484A discloses a reading control device that controls reading of identification information given to cartridges disposed in a given direction. The reading control device comprises image acquisition means for acquiring an image of identification information depending on a reading condition stored in storage means and associated with a reading position of the identification information, and condition control means for changing the reading condition in a case where the reading of the identification information cannot be performed based on the acquired image, and updates the reading condition stored in the storage means with the changed reading condition in a case where the reading of the identification information can be performed based on the image acquired by the image acquisition means under the changed reading condition.

WO2005/004142A discloses a library device. The library device comprises a medium storage that has a plurality of storage cells to store a storage medium with a barcode label, a recording and reproducing device that performs at least one of recording or reproduction of information using the storage medium, a medium transport device that transports the storage medium between the medium storage and the recording and reproducing device, and a reading device that is mounted in the medium transport device and optically reads the barcode label of the storage medium by line scanning of a one-dimensional imaging element. The library device is provided with an inventory processing unit that reads the barcode label of the storage medium by scanning per one barcode label a plurality of times with the reading device while the medium transport device is moved and notifies of stored medium information, a cause of error specification processing unit that extracts error data from a reading result obtained by the inventory processing unit to determine the presence or absence of the barcode label, in a case where determination is made that the barcode label is present, execute predetermined library processing, and in a case where determination is made that the barcode label is absent, reports a determination result without executing the library processing.

JP2004-22072A discloses a library device. The library device is a library device for a noncontact library device storage medium, the library device including means for tilting (or rolling) a posture of a barcode reader in a case where a reading disable signal is output from the barcode reader, and means for performing reading again after tilting (or rolling).

SUMMARY

An embodiment according to the technique of the present disclosure provides a magnetic tape cartridge, a cartridge management system, a reading method, and a non-transitory storage medium storing a program capable of realizing accurate reading of an identifier, compared to a case where an identifier is read while information regarding a reading condition is not taken into consideration.

A first aspect according to the technique of the present disclosure is a magnetic tape cartridge comprising a case on which an identifier is displayed, and a storage medium in which reading condition information that is information regarding a condition for reading the identifier is stored.

A second aspect according to the technique of the present disclosure is the magnetic tape cartridge according to the first aspect, in which the reading condition information includes optical condition information that is information regarding an optical condition for optically reading the identifier and/or label information that is information regarding a label on which the identifier is printed.

A third aspect according to the technique of the present disclosure is the magnetic tape cartridge according to the second aspect, in which the optical condition information includes at least one of reflectance information that is information regarding reflectance, light source output information that is information regarding an output of a light source, or exposure time information that is information regarding an exposure time.

A fourth aspect according to the technique of the present disclosure is the magnetic tape cartridge according to the third aspect, in which the reflectance information includes information indicating a relationship between the reflectance and a reading angle.

A fifth aspect according to the technique of the present disclosure is the magnetic tape cartridge according to the third aspect or the fourth aspect, in which the exposure time information includes information indicating a specified value of the exposure time.

A sixth aspect according to the technique of the present disclosure is the magnetic tape cartridge according to any one of the third aspect to the fifth aspect, in which the light source output information includes information indicating the reflectance depending on the output of the light source.

A seventh aspect according to the technique of the present disclosure is the magnetic tape cartridge according to the second aspect, in which the label information includes material information indicating a material of the label.

An eighth aspect according to the technique of the present disclosure is the magnetic tape cartridge according to the second aspect, in which the label information includes surface state information that is information regarding a surface state of the label.

A ninth aspect according to the technique of the present disclosure is the magnetic tape cartridge according to the eighth aspect, in which the surface state information includes information indicating presence or absence of a laminate film on a surface of the label.

A tenth aspect according to the technique of the present disclosure is the magnetic tape cartridge according to any one of the first aspect to the ninth aspect, in which the storage medium is a cartridge memory.

An eleventh aspect according to the technique of the present disclosure is the magnetic tape cartridge according to any one of the first aspect to the tenth aspect, in which the identifier includes a one-dimensional image and/or a two-dimensional matrix image.

A twelfth aspect according to the technique of the present disclosure is a cartridge management system that is applied to the magnetic tape cartridge according to any one of the first aspect to the eleventh aspect, the cartridge management system comprising a processor, and a reading device that reads the identifier, in which the processor is configured to acquire the reading condition information stored in the storage medium, and make the reading device read the identifier based on the reading condition information.

A thirteenth aspect according to the technique of the present disclosure is the cartridge management system according to the twelfth aspect, in which the processor is configured to change a reading setting of the reading device in a case of reading the identifier, based on the reading condition information.

A fourteenth aspect according to the technique of the present disclosure is a reading method comprising acquiring reading condition information that is stored in a storage medium of a magnetic tape cartridge, and is information regarding a condition for reading an identifier displayed on a case of the magnetic tape cartridge, and reading the identifier based on the reading condition information.

A fifteenth aspect according to the technique of the present disclosure is a non-transitory storage medium storing a program that causes a computer to execute a process, the process comprising acquiring reading condition information that is stored in a storage medium of a magnetic tape cartridge, and is information regarding a condition for reading an identifier displayed on a case of the magnetic tape cartridge, and reading the identifier based on the reading condition information.

DETAILED DESCRIPTION

First, terms that are used in the following description will be described.

NVM is an abbreviation for "Non-Volatile Memory". CPU is an abbreviation for "Central Processing Unit". GPU is an abbreviation for "Graphics Processing Unit". RAM is an abbreviation for "Random Access Memory". EEPROM is an abbreviation for "Electrically Erasable and Programmable Read Only Memory". EL is an abbreviation for "Electronic Luminescent". LCD is an abbreviation for "Liquid Crystal Display". SSD is an abbreviation for "Solid State Drive". HDD is an abbreviation for "Hard Disk Drive". USB is an abbreviation for "Universal Serial Bus". ASIC is an abbreviation for "Application Specific Integrated Circuit". FPGA is an abbreviation for "Field-Programmable Gate Array". SoC is an abbreviation for "System-on-a-chip". PLC is an abbreviation for "Programmable Logic Controller". IC is an abbreviation for "Integrated Circuit". RFID is an abbreviation for "Radio Frequency IDentifier". CCD is an abbreviation for "Charge-Coupled Device". LED is an abbreviation for "Light-Emitting Diode". PET is an abbreviation for "Poly Ethylene Terephthalate".

First Embodiment

Figure 1:
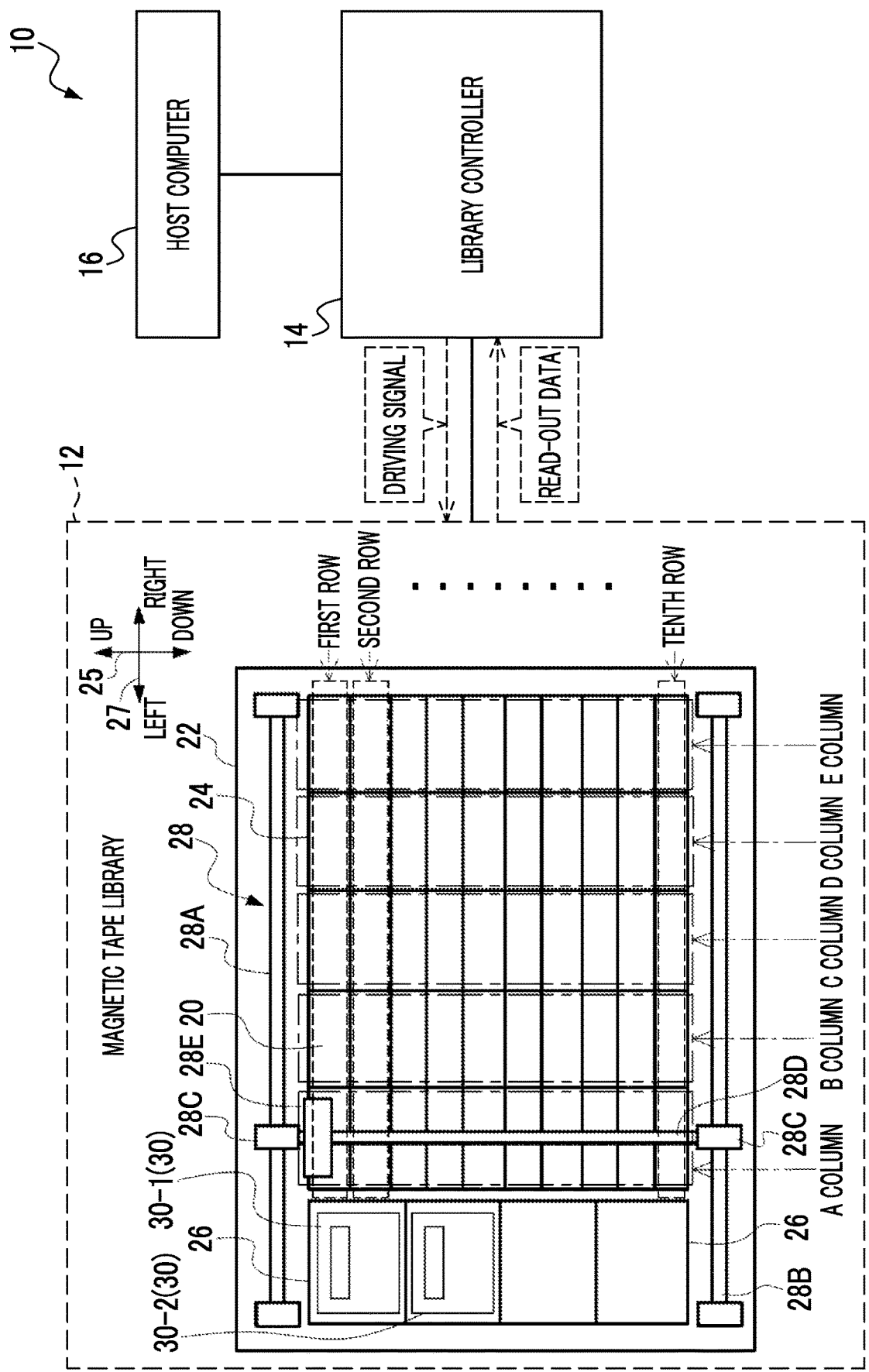
FIG. 1 is a schematic configuration diagram showing an example of the configuration of a cartridge management system according to an embodiment.

As shown in FIG. 1 as an example, a cartridge management system 10 comprises a magnetic tape library 12, a library controller 14, and a host computer 16.

The magnetic tape library 12 comprises a storage rack 22 that stores a plurality of magnetic tape cartridges 20 and one or more magnetic tape drives 30. The storage rack 22 is provided with a plurality of cartridge storage cells 24, a plurality of drive storage cells 26, and a transport mechanism 28. The magnetic tape cartridge 20 is an example of a "magnetic tape cartridge" according to the technique of the present disclosure, and the cartridge management system 10 is an example of a "cartridge management system" according to the technique of the present disclosure.

Each cartridge storage cell 24 has, for example, a size capable of storing one magnetic tape cartridge 20, and a predetermined number of magnetic tape cartridges 20, for example, one magnetic tape cartridge is stored in each cartridge storage cell 24. The cartridge storage cells 24 are arranged in a lattice of, for example, 10 rows×5 columns. In the example shown in FIG. 1, although the cartridge storage cells 24 of 10 rows×5 columns are shown, this is merely an example, and it should suffice that the number of cartridge storage cells 24 is plural. Here, although a lattice-shaped arrangement is shown, this is merely an example, and other arrangement methods may be applied.

In FIG. 1, as indicated by a two-way arrow 25, a direction to the upside of the paper plane is referred to as an up direction, and a direction to the downside of the paper plane is referred to as a down direction. As indicated by a two-way arrow 27, a direction to the left of the paper plane is referred to as a left direction, and a direction to the right of the paper plane is referred to as a right direction.

In the example shown in FIG. 1, each row of the cartridge storage cell 24 is given a row number of 1 to 10 in order from the top in FIG. 1, and each column of the cartridge storage cell 24 is given a column symbol of A to E in order from the left in FIG. 1. Each cartridge storage cell 24 is given a cell name for identifying a position of the cartridge storage cell 24 using the row number and the column symbol. For example, the cartridge storage cell 24 positioned in the A column and the first row is given a cell name "A1".

One magnetic tape drive 30 is stored in each drive storage cell 26. In the example shown in FIG. 1, a first magnetic tape drive 30-1 is stored in the uppermost drive storage cell 26 among four drive storage cells 26 arranged in a vertical direction, and a second magnetic tape drive 30-2 is stored in a second uppermost drive storage cell 26. In the example shown in FIG. 1, although the number of drive storage cells 26 is four, the technique of the present disclosure is not limited, and the number of drive storage cells 26 may be one or more. In the following description, the first magnetic tape drive 30-1 and the second magnetic tape drive 30-2 are simply represented as a "magnetic tape drive 30" in a case where there is no need for distinction therebetween.

The magnetic tape cartridge 20 is loaded into the magnetic tape drive 30. The library controller 14 outputs a tape drive driving signal to the magnetic tape drive 30. The tape drive driving signal is a signal that instructs the magnetic tape drive 30 to drive. The magnetic tape drive 30 performs reading of data from the magnetic tape MT accommodated in the magnetic tape cartridge 20 and writing of data to the magnetic tape MT in response to the tape drive driving signal.

The transport mechanism 28 transports the magnetic tape cartridge 20 between the cartridge storage cell 24 and the magnetic tape drive 30. In the example shown in FIG. 1, the transport mechanism 28 comprises an upper bar 28A, a lower bar 28B, a pair of horizontally movable robots 28C, a vertical bar 28D, and a vertically movable robot 28E. The upper bar 28A is fixed to an upper portion of the storage rack 22 to extend in a horizontal direction. The lower bar 28B is fixed to a lower portion of the storage rack 22 in parallel with the upper bar 28A.

A pair of horizontally movable robots 28C is attached to both ends of the vertical bar 28D. A pair of horizontally movable robots 28C is fitted to the upper bar 28A and the lower bar 28B. The horizontally movable robots 28C are self-propellable robots that can move along the horizontal direction, and move the vertical bar 28D in the horizontal direction along the upper bar 28A and the lower bar 28B while maintaining the orientation of the vertical bar 28D vertically with respect to the orientations of the upper bar 28A and the lower bar 28B. The vertically movable robot 28E is attached to the vertical bar 28D. The vertically movable robot 28E is a self-propellable robot that can move along a vertical direction. That is, the vertically movable robot 28E moves in the vertical direction along the vertical bar 28D. The vertically movable robot 28E is provided with a holding part (not shown) that holds the magnetic tape cartridge 20.

Although a form example where the transport mechanism 28 includes the horizontally movable robots 28C and the vertically movable robot 28E has been described, this is merely an example. The transport mechanism 28 may have a configuration in which the magnetic tape cartridge 20 can be transported in the magnetic tape library 12.

The transport mechanism 28 operates under the control of the library controller 14. The library controller 14 outputs a transport mechanism driving signal to the transport mechanism 28. The transport mechanism driving signal is a signal that instructs the transport mechanism 28 to drive. A motor (not shown) is mounted in each of the horizontally movable robots 28C and the vertically movable robot 28E, and the motor of each of the horizontally movable robots 28C and the vertically movable robot 28E is driven in response to the transport mechanism driving signal input from the library controller 14 to generate power. The horizontally movable robots 28C and the vertically movable robot 28E are self-propelled using power generated by a motor.

The library controller 14 is connected to the magnetic tape library 12 to be communicable through a communication cable. The library controller 14 integrally controls the transport mechanism 28 and the magnetic tape drive 30. For example, the library controller 14 controls taking-out of the magnetic tape cartridge 20 from the cartridge storage cell 24 and storage of the magnetic tape cartridge 20 in the cartridge storage cell 24. The library controller 14 controls transport of the magnetic tape cartridge 20. The library controller 14 controls loading of the magnetic tape cartridge 20 into the magnetic tape drive 30 and taking-out of the magnetic tape cartridge 20 from the magnetic tape drive 30. The library controller 14 controls reading of data from the magnetic tape MT, writing of data to the magnetic tape MT, and the like.

The host computer 16 is connected to the library controller 14 to be communicable through a communication cable. Here, although wired communication has been illustrated, the technique of the present disclosure is not limited thereto, and wireless communication may be applied. The host computer 16 receives an instruction from a user and instructs reading of data from the magnetic tape MT accommodated in the magnetic tape cartridge 20 and writing of data to the magnetic tape MT.

The library controller 14 searches for a specific magnetic tape cartridge 20 (for example, a magnetic tape cartridge 20 to be a target for reading and writing of data) from a plurality of magnetic tape cartridges 20, makes the transport mechanism 28 take out the specific magnetic tape cartridge 20 from the cartridge storage cell 24, or makes the magnetic tape drive 30 read and write data from and to the magnetic tape MT in the specific magnetic tape cartridge 20, under the control of the host computer 16.

Next, an example of the configuration of the magnetic tape cartridge 20 will be described referring to FIGS. 2 and 3. In the following description, for convenience of description, a loading direction of the magnetic tape cartridge 20 into the magnetic tape drive 30 is indicated by an arrow A, an arrow A direction is referred to as a front direction of the magnetic tape cartridge 20, and a side in the front direction of the magnetic tape cartridge 20 is referred to as a front side of the magnetic tape cartridge 20. In the following description of the structure, "front" indicates the front side of the magnetic tape cartridge 20.

In the following description, for convenience of description, a direction opposite to the front direction of the magnetic tape cartridge 20 is referred to as a rear direction of the magnetic tape cartridge 20, and a side in the rear direction of the magnetic tape cartridge 20 is referred to as a rear side of the magnetic tape cartridge 20. In the following description of the structure, "rear" indicates the rear side of the magnetic tape cartridge 20.

In the following description, for convenience of description, an arrow B direction perpendicular to the arrow A direction is referred to as a right direction, and a side in the right direction of the magnetic tape cartridge 20 is referred to as a right side of the magnetic tape cartridge 20. In the following description of the structure, "right" indicates the right side of the magnetic tape cartridge 20.

In the following description, for convenience of description, a direction perpendicular to the arrow A direction and the arrow B direction is indicated by an arrow C, an arrow C direction is referred to as an up direction of the magnetic tape cartridge 20, and a side in the up direction of the magnetic tape cartridge 20 is referred to as an upside of the magnetic tape cartridge 20. In the following description of the structure, "up" indicates the upside of the magnetic tape cartridge 20.

In the following description, for convenience of description, a direction opposite to the up direction of the magnetic tape cartridge 20 is referred to as a down direction of the magnetic tape cartridge 20, and a side in the down direction of the magnetic tape cartridge 20 is referred to as a downside of the magnetic tape cartridge 20. In the following description of the structure, "down" indicates the downside of the magnetic tape cartridge 20.

Figure 2:
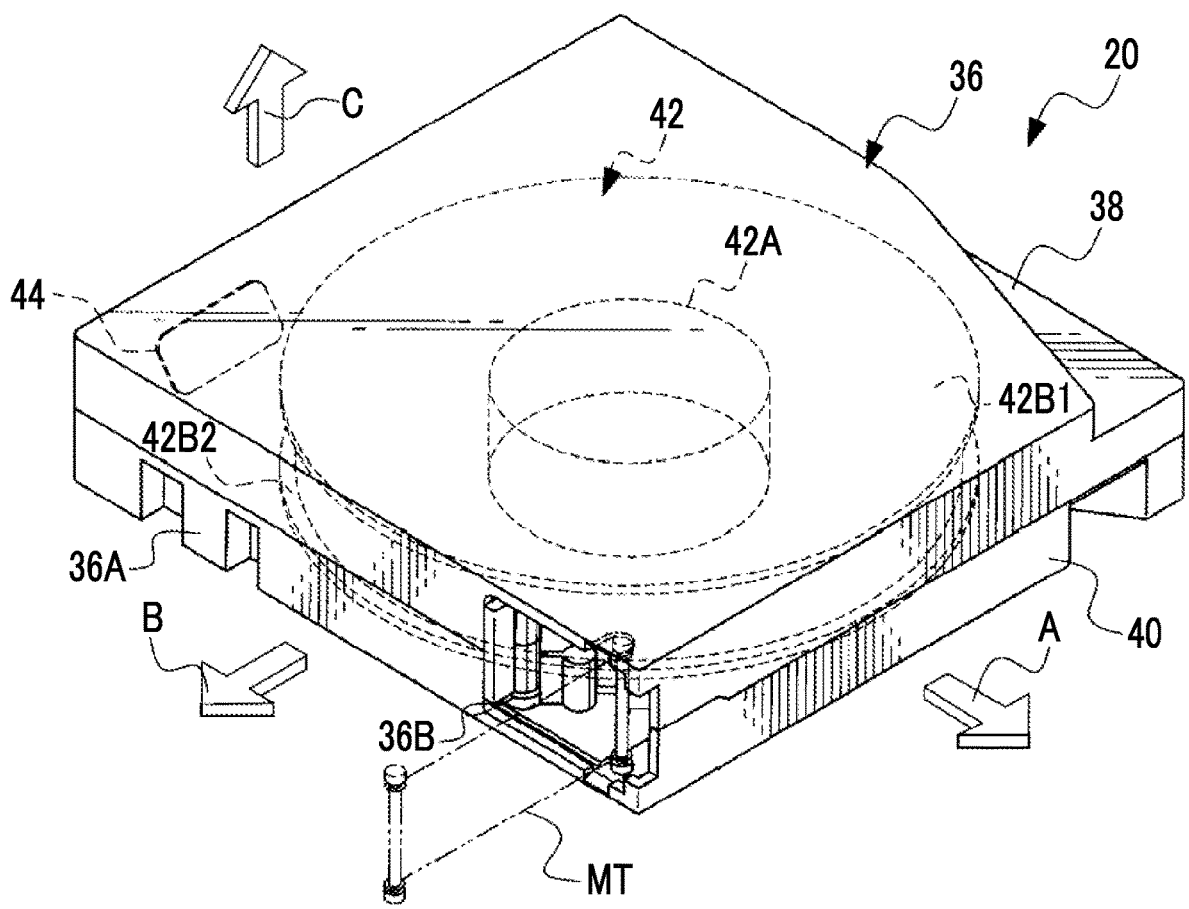
FIG. 2 is a schematic perspective view showing an example of the appearance of a magnetic tape cartridge according to the embodiment.

As shown in FIG. 2 as an example, the magnetic tape cartridge 20 has a substantially rectangular shape in plan view, and comprises a box-shaped case 36. The magnetic tape MT is accommodated in the case 36. The case 36 is formed of resin, such as polycarbonate, and comprises an upper case 38 and a lower case 40. The upper case 38 and the lower case 40 are bonded by welding (for example, ultrasonic welding) and screwing in a state in which a lower peripheral edge surface of the upper case 38 and an upper peripheral edge surface of the lower case 40 are brought into contact with each other. A bonding method is not limited to welding and screwing, and other bonding methods may be used. The case 36 is an example of a "case" according to the technique of the present disclosure.

Inside the case 36, a sending reel 42 is rotatably accommodated. The sending reel 42 comprises a reel hub 42A, an upper flange 42B1, and a lower flange 42B2. The reel hub 42A is formed in a cylindrical shape. The reel hub 42A is a shaft center portion of the sending reel 42, has a shaft center direction along an up-down direction of the case 36, and is disposed in a center portion of the case 36. Each of the upper flange 42B1 and the lower flange 42B2 is formed in an annular shape. A center portion in plan view of the upper flange 42B1 is fixed to an upper end portion of the reel hub 42A, and a center portion in plan view of the lower flange 42B2 is fixed to a lower end portion of the reel hub 42A. The reel hub 42A and the lower flange 42B2 may be integrally molded.

The magnetic tape MT is wound around an outer peripheral surface of the reel hub 42A, and an end portion in a width direction of the magnetic tape MT is held by the upper flange 42B1 and the lower flange 42B2.

An opening 36B is formed on a front side of a right wall 36A of the case 36. The magnetic tape MT is pulled out from the opening 36B.

A cartridge memory 44 is provided in the lower case 40. Specifically, the cartridge memory 44 is accommodated in a rear right end portion of the lower case 40. An IC chip (not shown) having an NVM is mounted on the cartridge memory 44. In the present embodiment, a so-called passive type RFID tag is employed as the cartridge memory 44, and reading and writing of various kinds of information are performed with respect to the cartridge memory 44 in a noncontact manner. The cartridge memory 44 is an example of a "storage medium" and a "cartridge memory" according to the technique of the present disclosure.

In the cartridge memory 44, management information for managing the magnetic tape cartridge 20 is stored. The management information includes, for example, information regarding the cartridge memory 44 (for example, information capable of specifying the magnetic tape cartridge 20), information regarding the magnetic tape MT (for example, information indicating a recording capacity of the magnetic tape MT, information indicating the outline of data recorded on the magnetic tape MT, information indicating items of data recorded on the magnetic tape MT, and information indicating a recording format of data recorded on the magnetic tape MT), and information regarding the magnetic tape drive 30 (for example, information indicating the specification of the magnetic tape drive 30 and signals that are used in the magnetic tape drive 30). Although details will be described below, reading condition information 68 (see FIG. 7) is stored in the cartridge memory 44.

Figure 3:
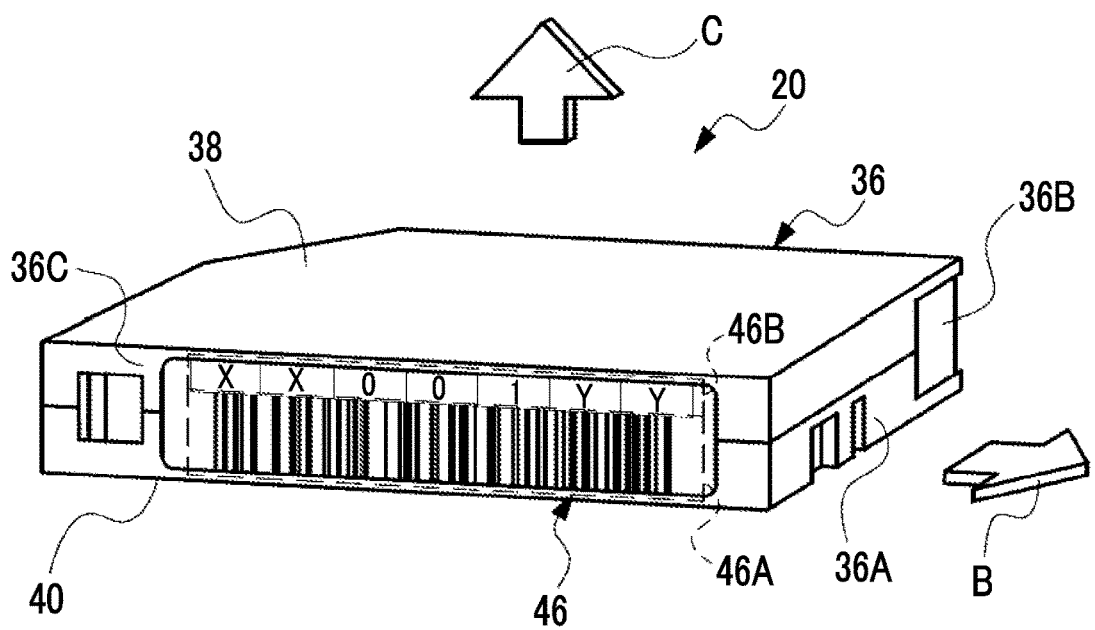
FIG. 3 is a schematic perspective view showing an example of an identifier displayed on the magnetic tape cartridge according to the embodiment.

As shown in FIG. 3 as an example, an identifier 46 is displayed on a surface of the case 36 of the magnetic tape cartridge 20. In the example shown in FIG. 3, the identifier 46 is displayed on a surface of a rear wall 36C of the case 36. The identifier 46 includes a barcode 46A. The barcode 46A is a one-dimensional image indicating information (for example, a serial number for managing the magnetic tape cartridge 20 given by the user) for identifying the magnetic tape cartridge 20. The magnetic tape cartridge 20 is stored in the cartridge storage cell 24 in a state in which the identifier 46 can be read. The identifier 46 is an example of an "identifier" according to the technique of the present disclosure, and the barcode 46A is an example of a "one-dimensional image" according to the technique of the present disclosure.

In the example shown in FIG. 3, the identifier 46 includes a character string 46B. The character string 46B is a character string (for example, a character string including a combination of alphanumeric characters) indicating information for identifying the magnetic tape cartridge 20. The character string 46B is displayed, whereby the user can visually identify the magnetic tape cartridge 20.

Although the identifier 46 is displayed on the case 36, for example, in such a manner that a label 72 (see FIG. 14) on which the barcode 46A and the character string 46B are printed is stuck to the surface of the case 36, this is merely an example. The identifier 46 may be printed directly on the surface of the case 36.

Figure 4:
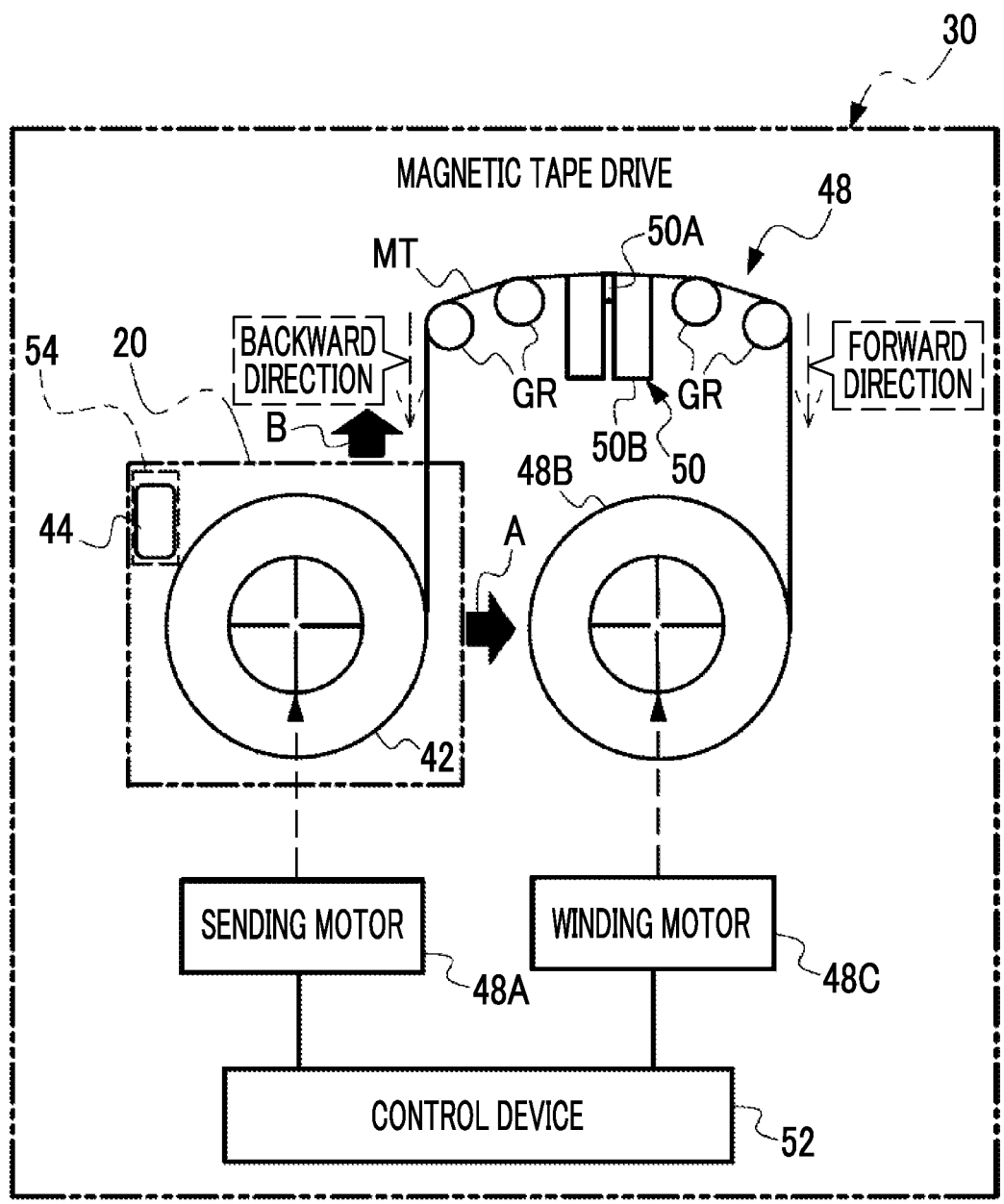
FIG. 4 is a schematic configuration diagram showing an example of the hardware configuration of a magnetic tape drive according to the embodiment.

As shown in FIG. 4 as an example, the magnetic tape drive 30 comprises a tape transport device 48, a magnetic head 50, and a control device 52. The magnetic tape cartridge 20 is loaded into the magnetic tape drive 30 along the arrow A direction. In the magnetic tape drive 30, the magnetic tape MT is pulled out from the magnetic tape cartridge 20 for use.

The magnetic tape drive 30 executes magnetic processing on the surface of the magnetic tape MT using the magnetic head 50. Here, the magnetic processing indicates recording of data on the surface of the magnetic tape MT and reading of data (that is, reproduction of data) from the surface of the magnetic tape MT. In the present embodiment, the magnetic tape drive 30 selectively performs recording of data on the surface of the magnetic tape MT and reading of data from the surface of the magnetic tape MT using the magnetic head 50. That is, the magnetic tape drive 30 pulls out the magnetic tape MT from the magnetic tape cartridge 20 and records data on the surface of the pulled-out magnetic tape MT using the magnetic head 50 or reads data from the surface of the pulled-out magnetic tape MT using the magnetic head 50.

The control device 52 controls the entire magnetic tape drive 30. In the present embodiment, although the control device 52 is realized by an ASIC, the technique of the present disclosure is not limited thereto. For example, the control device 52 may be realized by an FPGA and/or a PLC. Alternatively, the control device 52 may be realized by a computer including a CPU, a flash memory (for example, an EEPROM and/or an SSD), and a RAM. In addition, the control device 52 may be realized by combining two or more of an ASIC, an FPGA, a PLC, and a computer. That is, the control device 52 may be realized by a combination of a hardware configuration and a software configuration.

The tape transport device 48 is a device that selectively transports the magnetic tape MT in a forward direction and a backward direction along a predetermined path, and comprises a sending motor 48A, a winding reel 48B, a winding motor 48C, and a plurality of guide rollers GR. Here, the forward direction indicates a sending direction of the magnetic tape MT, and the backward direction indicates a rewinding direction of the magnetic tape MT.

The sending motor 48A rotates the sending reel 42 in the magnetic tape cartridge 20 under the control of the control device 52. The control device 52 controls the sending motor 48A to control a rotation direction, a rotation speed, rotation torque, and the like of the sending reel 42.

The winding motor 48C rotates the winding reel 48B under the control of the control device 52. The control device 52 controls the winding motor 48C to control a rotation direction, a rotation speed, rotation torque, and the like of the winding reel 48B.

In a case where the magnetic tape MT is wound around the winding reel 48B, the control device 52 rotates the sending motor 48A and the winding motor 48C such that the magnetic tape MT runs along the predetermined path in the forward direction. The rotation speeds, the rotation torque, and the like of the sending motor 48A and the winding motor 48C are adjusted depending on a speed at which the magnetic tape MT is wound around the winding reel 48B. The rotation speed, the rotation torque, and the like of each of the sending motor 48A and the winding motor 48C are adjusted by the control device 52, whereby tension is given to the magnetic tape MT. The rotation speed, the rotation torque, and the like of each of the sending motor 48A and the winding motor 48C are adjusted by the control device 52, so that the tension that is given to the magnetic tape MT is controlled.

In a case where the magnetic tape MT is rewound around the sending reel 42, the control device 52 rotates the sending motor 48A and the winding motor 48C such that the magnetic tape MT runs along the predetermined path in the backward direction.

In the present embodiment, although the tension that is applied to the magnetic tape MT is controlled by controlling the rotation speeds, the rotation torque, and the like of the sending motor 48A and the winding motor 48C, the technique of the present disclosure is not limited thereto. For example, the tension that is applied to the magnetic tape MT may be controlled using a dancer roller or may be controlled by drawing the magnetic tape MT to a vacuum chamber.

Each of a plurality of guide rollers GR is a roller that guides the magnetic tape MT. The predetermined path, that is, a running path of the magnetic tape MT is determined by separately disposing a plurality of guide rollers GR at positions straddling over the magnetic head 50 between the magnetic tape cartridge 20 and the winding reel 48B.

The magnetic head 50 comprises a magnetic element unit 50A and a holder 50B. The magnetic element unit 50A is held by the holder 50B to be brought into contact with the running magnetic tape MT. The magnetic element unit 50A has a plurality of magnetic elements.

The magnetic element unit 50A records data on the magnetic tape MT that is transported by the tape transport device 48 or reads data from the magnetic tape MT that is transported by the tape transport device 48.

The magnetic tape drive 30 comprises a first noncontact reading and writing device 54. The first noncontact reading and writing device 54 is disposed to confront a back surface of the cartridge memory 44 on the downside of the magnetic tape cartridge 20 in a state in which the magnetic tape cartridge 20 is loaded, and performs reading and writing of information with respect to the cartridge memory 44 in a noncontact manner.

Figure 5:
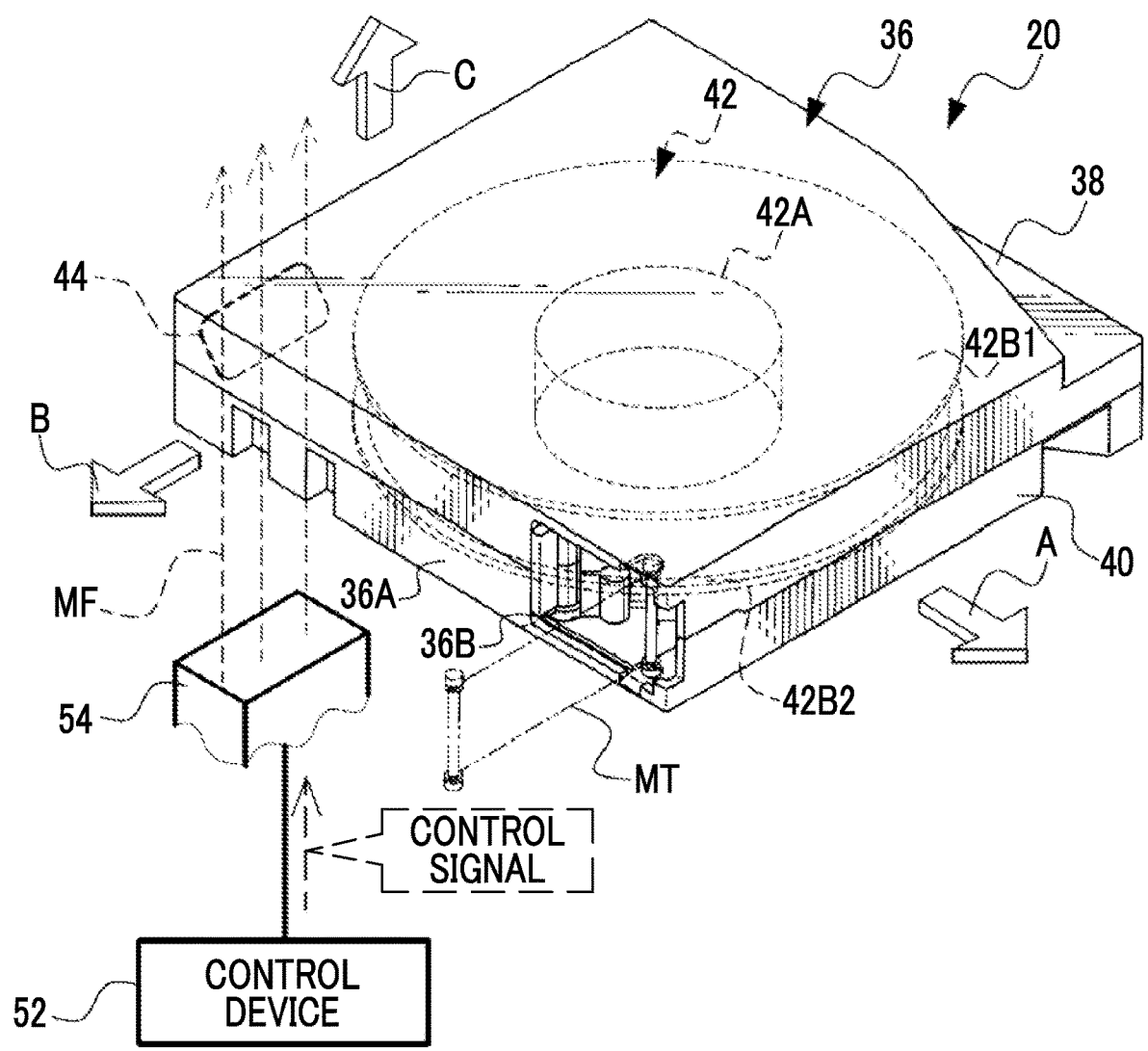
FIG. 5 is a schematic perspective view showing an example of an aspect where a magnetic field is discharged from a downside of the magnetic tape cartridge according to the embodiment by a first noncontact reading and writing device.

As shown in FIG. 5 as an example, the first noncontact reading and writing device 54 emits the magnetic field MF from below the magnetic tape cartridge 20 toward the cartridge memory 44. The magnetic field MF passes through the cartridge memory 44.

The first noncontact reading and writing device 54 is connected to the control device 52. The control device 52 outputs a control signal to the noncontact reading and writing device 54. The control signal is a signal for controlling the cartridge memory 44. The first noncontact reading and writing device 54 generates the magnetic field MF in response to the control signal input from the control device 52 and emits the generated magnetic field MF toward the cartridge memory 44.

The first noncontact reading and writing device 54 performs noncontact communication with the cartridge memory 44 through the magnetic field MF to execute processing depending on the control signal on the cartridge memory 44. For example, the first noncontact reading and writing device 54 selectively executes processing of reading information from the cartridge memory 44 and processing of storing information in the cartridge memory 44 (that is, processing of writing information to the cartridge memory 44) under the control of the control device 52.

Figure 6:
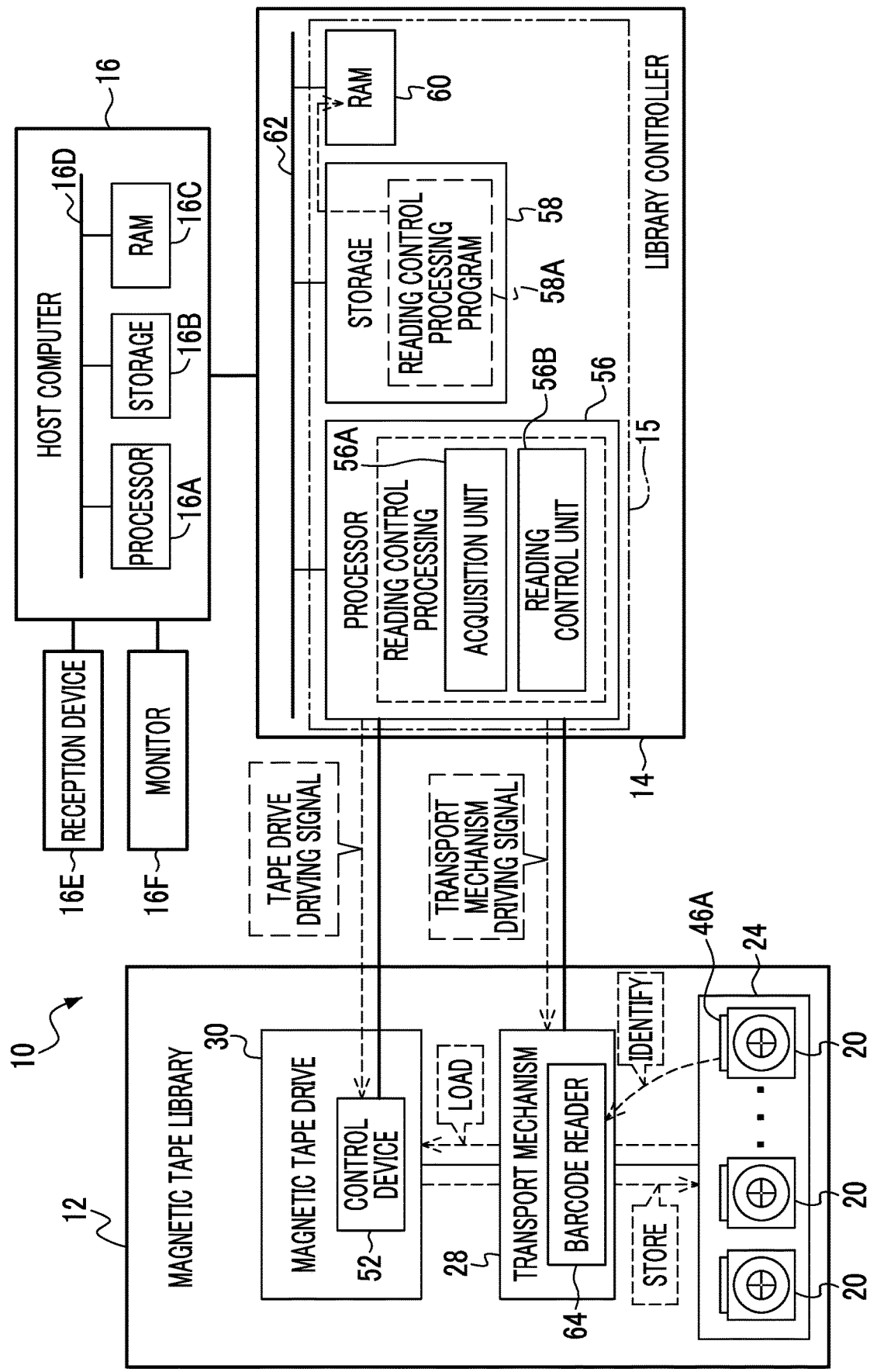
FIG. 6 is a schematic configuration diagram showing an example of the hardware configuration of the cartridge management system according to the embodiment.

As shown in FIG. 6 as an example, the library controller 14 comprises a computer 15. The computer 15 comprises a processor 56, a storage 58, and a RAM 60. The processor 56, the storage 58, and the RAM 60 are connected to a bus 62.

The computer 15 is an example of a "computer" according to the technique of the present disclosure.

The processor 56 controls the entire library controller 14. The processor 56 has, for example, a CPU and a GPU, and controls the entire library controller 14. The GPU operates under the control of the CPU, and is responsible for executing screen display and/or image processing. The processor 56 may be one or more CPUs in which a GPU function is integrated or may be one or more CPUs in which a GPU function is not integrated. The processor 56 is an example of a "processor" according to the technique of the present disclosure.

The storage 58 is a non-volatile storage device that stores various programs, various parameters, and the like. An example of the storage 58 is a flash memory (for example, an EEPROM and/or an SSD). The flash memory is merely an example, and other non-volatile storage devices, such as an HDD, may be employed or a combination of two kinds or more of non-volatile storage devices may be employed. The RAM 60 is a volatile memory that is used as a work area or the like at the time of execution of various programs.

The processor 56 outputs a transport mechanism driving signal. The transport mechanism 28 selectively performs a loading operation and a storage operation in response to the transport mechanism driving signal input from the processor 56. The loading operation indicates an operation to take out the magnetic tape cartridge 20 from the cartridge storage cell 24 and to load the magnetic tape cartridge 20 into the magnetic tape drive 30 by moving the horizontally movable robots 28C (see FIG. 1) and the vertically movable robot 28E (see FIG. 1). The storage operation indicates an operation to take out the magnetic tape cartridge 20 from the magnetic tape drive 30 and to store the magnetic tape cartridge 20 in the original cartridge storage cell 24. In a case where the driving of the transport mechanism 28 based on the transport mechanism driving signal ends, the transport mechanism 28 returns a reference position (for example, the A1 cell) again.

The processor 56 outputs a tape drive driving signal. The control device 52 of the magnetic tape drive 30 selectively performs a readout operation to read out data from the magnetic tape MT (see FIG. 5) and a writing operation to write data to the magnetic tape MT in response to the tape drive driving signal input from the processor 56.

The host computer 16 gives an instruction depending on a user's request to the library controller 14. The host computer 16 comprises a processor 16A, a storage 16B, and a RAM 16C. The processor 16A controls the entire host computer 16. An example of the processor 16A is a CPU. The storage 16B is a non-volatile memory. Various programs are stored in the storage 16B. An example of the storage 16B is a flash memory (for example, an EEPROM and/or an SSD). The RAM 16C is a volatile memory that is used as a work area or the like at the time of execution of various programs.

The processor 16A, the storage 16B, and the RAM 16C are connected to a bus 16D. For example, a reception device 16E including, for example, a mouse, a keyboard, and a touch panel, and a monitor 16F, for example, an EL display or an LCD, is connected to the host computer 16. The reception device 16E receives an instruction from the user with respect to the host computer 16. The monitor 16F displays an output from the host computer 16 on a screen. Here, although the reception device 16E and the monitor 16F are illustrated as independent devices, the technique of the present disclosure is not limited thereto, and an input/output device in which the reception device 16E and the monitor 16F are integrated may be applied. An example of the input/output device is a touch panel display in which the touch panel included in the reception device 16E and the monitor 16F are integrated.

By the way, in a case where the transport mechanism 28 performs the loading operation, it is necessary to identify the magnetic tape cartridge 20 to be a target for the loading operation. The transport mechanism 28 comprises a barcode reader 64. As described above, the barcode 46A is displayed on the case 36 of the magnetic tape cartridge 20. The barcode 46A is read through the barcode reader 64, so that the magnetic tape cartridge 20 to be a target for the loading operation is identified.

Note that, in a case where the barcode 46A is read, the barcode 46A may not be correctly read due to the quality of the label on which the barcode 46A is printed and/or an optical condition (for example, a reading angle, reflectance, or an exposure time) in the barcode reader 64.

Accordingly, in consideration of such a situation, in the present embodiment, reading control processing is executed by the processor 56. A reading control processing program 58A is stored in the storage 58. The processor 56 executes the reading control processing by reading out the reading control processing program 58A from the storage 58 and executing the read-out reading control processing program 58A on the RAM 60. The reading control processing is realized by the processor 56 operating as an acquisition unit 56A and a reading control unit 56B. The reading control processing program 58A is an example of a "program" according to the technique of the present disclosure.

Figure 7:
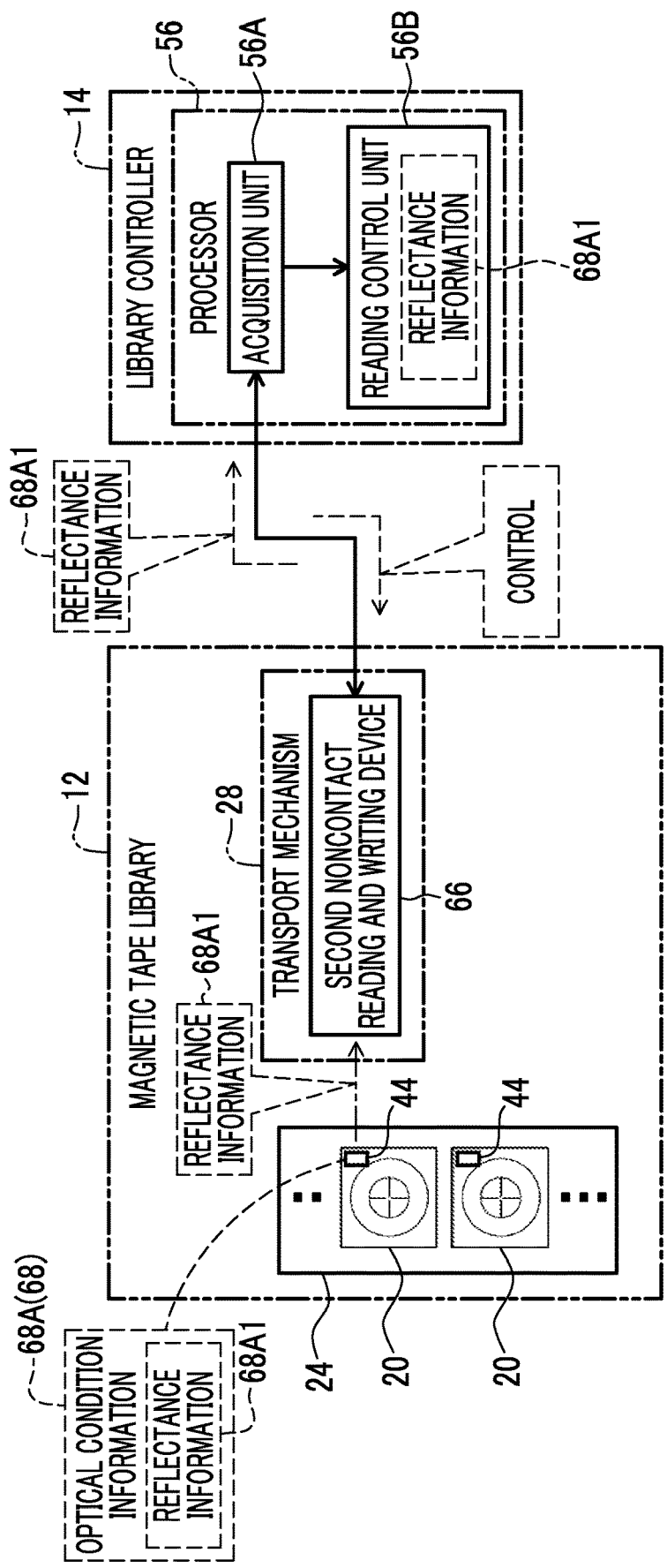
FIG. 7 is a conceptual diagram showing an example of a function of a library controller included in the cartridge management system according to the embodiment.

As shown in FIG. 7 as an example, the transport mechanism 28 comprises a second noncontact reading and writing device 66. The acquisition unit 56A operates the second noncontact reading and writing device 66 provided in the transport mechanism 28. The second noncontact reading and writing device 66 performs noncontact communication with the cartridge memory 44 through a magnetic field to execute processing on the cartridge memory 44 depending on the control of the acquisition unit 56A. For example, the second noncontact reading and writing device 66 executes processing of reading the reading condition information 68 from the cartridge memory 44 under the control of the acquisition unit 56A.

The reading condition information 68 is stored in advance in the cartridge memory 44. The reading condition information 68 may be stored in the cartridge memory 44 in a manufacturing stage of the magnetic tape cartridge 20 or may be stored in a use stage of the magnetic tape cartridge 20. The reading condition information 68 is an example of a "reading condition information" according to the technique of the present disclosure.

The reading condition information 68 is information regarding a condition for reading the identifier 46. In the example shown in FIG. 7, as the reading condition information 68, optical condition information 68A is stored in the cartridge memory 44. The optical condition information 68A is information regarding an optical condition for optically reading the identifier 46. For example, the optical condition information 68A is obtained by a computer simulation and/or a test with a real machine. In the example shown in FIG. 7, as the optical condition information 68A, reflectance information 68A1 is stored in the cartridge memory 44. The reflectance information 68A1 is information regarding reflectance R (see FIG. 8) in the identifier 46 in a case of reading the identifier 46. The optical condition information 68A is an example of "optical condition information" according to the technique of the present disclosure, and the reflectance information 68A1 is an example of "reflectance information" according to the technique of the present disclosure.

The second noncontact reading and writing device 66 outputs the reflectance information 68A1 read from the cartridge memory 44 to the acquisition unit 56A. The acquisition unit 56A acquires the reflectance information 68A1 from the second noncontact reading and writing device 66. The acquisition unit 56A outputs the acquired reflectance information 68A1 to the reading control unit 56B.

Figure 8:
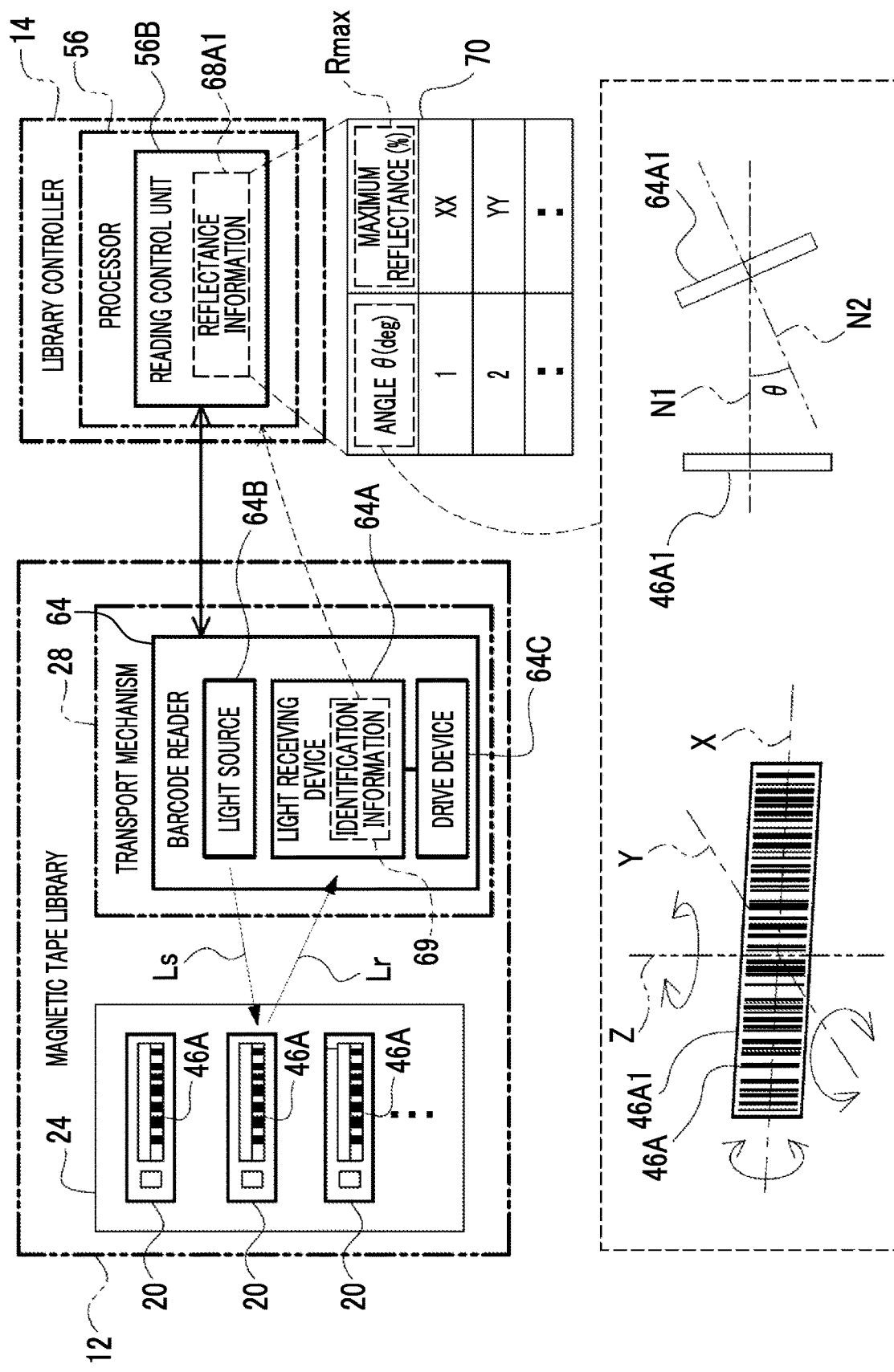
FIG. 8 is a conceptual diagram showing an example of a function of the library controller included in the cartridge management system according to the embodiment.

As shown in FIG. 8 as an example, the reading control unit 56B controls the optical condition in the barcode reader 64 based on the reflectance information 68A1 acquired from the acquisition unit 56A (see FIG. 7). Here, in the reflectance information 68A1, information indicating a relationship between the reflectance R (for example, maximum reflectance Rmax) and a reading angle θ is included. In the following description, an example where the reading angle θ is an angle between a normal line N1 of a plane 46A1 on which the identifier 46 is printed and a normal line N2 of a light receiving surface 64A1 of a light receiving device 64A and is a rotation angle around a virtual axis X (that is, an axis along a direction in which bars are arranged in the barcode 46A) in the barcode 46A. The maximum reflectance Rmax indicates a maximum value of the reflectance R in a scanning reflectance waveform of the barcode 46A.

In the example shown in FIG. 8, a table 70 that shows the relationship between the reading angle θ and the maximum reflectance Rmax is shown as the reflectance information 68A1. A relationship between a reading angle ω that is a rotation angle around a virtual axis Y (that is, an axis along a direction of the normal line N1 of the plane 46A1 on which the identifier 46 is printed) in the barcode 46A, instead of the reading angle θ or along with the reading angle θ, and the maximum reflectance Rmax may be included in the table 70.

A relationship between a reading angle φ that is a rotation angle around a virtual axis Z (that is, an axis perpendicular to the virtual axis X and the virtual axis Y) in the barcode 46A, instead of the reading angle θ and the reading angle ω or along with the reading angle θ and the reading angle ω, and the maximum reflectance Rmax may be included in the table 70.

Although the table 70 is illustrated as the reflectance information 68A1, this is merely an example. The reflectance information 68A1 may be, for example, an operational expression (not shown) having the reading angle θ as an independent variable and the maximum reflectance Rmax as a dependent variable.

A minimum reflectance Rmin may be used instead of the maximum reflectance Rmax or along with the maximum reflectance Rmax. Here, the minimum reflectance Rmin is a minimum value of the reflectance R in the scanning reflectance waveform of the barcode 46A.

The reading control unit 56B controls the optical condition in the barcode reader 64 using the table 70. In other words, the reading control unit 56B changes a reading setting in the barcode reader 64. The barcode reader 64 is a device that reads the barcode 46A. The barcode reader 64 comprises a light receiving device 64A and a light source 64B. For example, the light receiving device 64A is a CCD sensor. For example, the light source 64B is an LED light source that can emit infrared light. The barcode reader 64 is an example of a "reading device" according to the technique of the present disclosure.

For example, the reading control unit 56B changes a position (for example, the reading angle θ of the light receiving surface 64A1 of the light receiving device 64A using the table 70 such that the maximum reflectance Rmax is equal to or greater than a predetermined value (for example, 60%). More specifically, the reading control unit 56B outputs a control signal for operating a drive device 64C. The drive device 64C operates in response to the control signal, thereby changing the reading angle θ of the light receiving device 64A with respect to the barcode 46A. In this way, the reading setting in the barcode reader 64 is changed.

In a state in which the reading setting in the barcode reader 64 is changed, the barcode reader 64 reads the barcode 46A of the magnetic tape cartridge 20. Scanning light Ls emitted from the light source 64B is reflected by the barcode 46A. A part of the scanning light Ls is reflected in the barcode 46A, whereby return light Lr is obtained. The return light Lr is detected in the light receiving device 64A. The barcode reader 64 generates identification information 69 that is information for identifying the barcode 46A, based on a detection result of the return light Lr. The identification information 69 is output from the barcode reader 64 to the processor 56 of the library controller 14.

Figure 9:
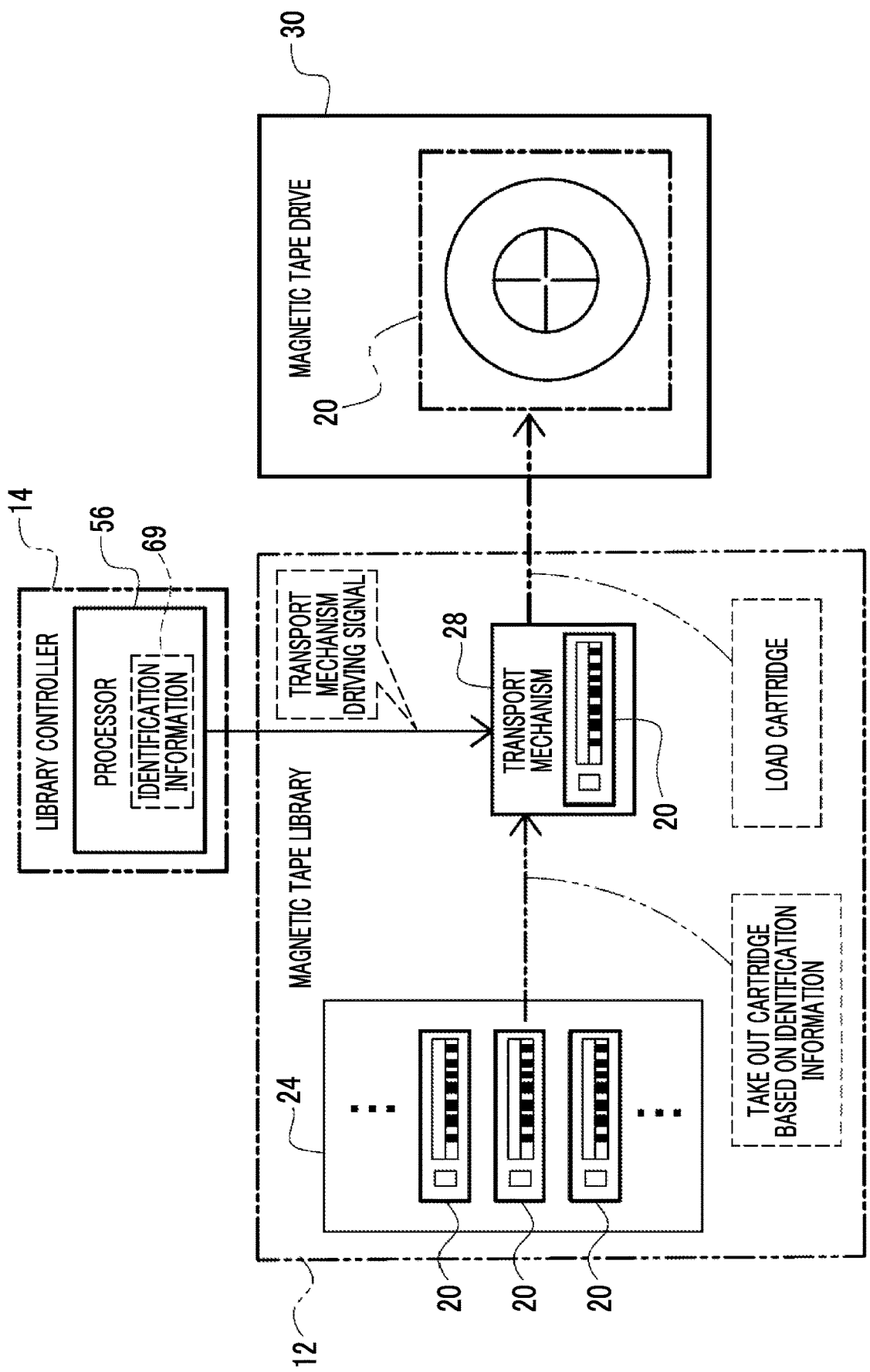
FIG. 9 is a conceptual diagram showing an example of a function of the library controller included in the cartridge management system according to the embodiment.

As shown in FIG. 9 as an example, the processor 56 determines whether or not the magnetic tape cartridge 20 specified by the content shown in the identification information 69 is the magnetic tape cartridge 20 as a target for the loading operation. In a case where the magnetic tape cartridge 20 specified by the content shown in the identification information 69 is the magnetic tape cartridge 20 as a target for the loading operation, the processor 56 outputs the transport mechanism driving signal to the transport mechanism 28. The transport mechanism 28 performs the loading operation in response to the transport mechanism driving signal. That is, the transport mechanism 28 pulls out the magnetic tape cartridge 20 specified by the identification information 69 and transports the magnetic tape cartridge 20 to the magnetic tape drive 30. In addition, the transport mechanism 28 loads the magnetic tape cartridge 20 into the magnetic tape drive 30. The magnetic tape drive 30 selectively performs recording of data on the surface of the magnetic tape MT (see FIG. 4) and reading of data from the surface of the magnetic tape MT with respect to the loaded magnetic tape cartridge 20.

Figure 10:
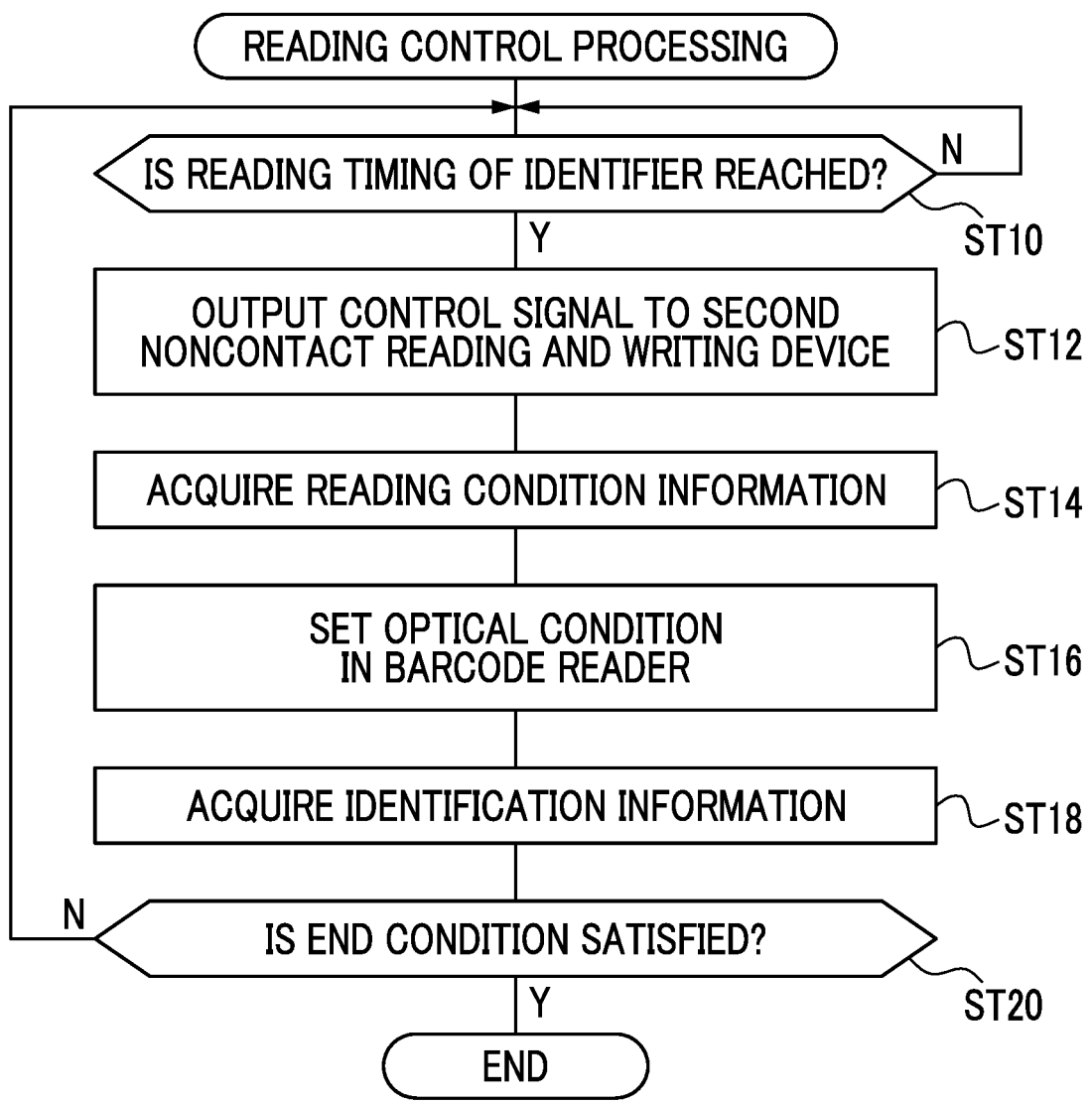
FIG. 10 is a flowchart illustrating an example of a flow of reading control processing according to the embodiment.

Next, the operations of the cartridge management system 10 will be described referring to FIG. 10. FIG. 10 shows an example of a flow of the reading control processing that is executed by the processor 56 of the library controller 14. The reading control processing shown in FIG. 10 is an example of a "reading method" according to the technique of the present disclosure.

In the reading control processing shown in FIG. 10, first, in Step ST10, the acquisition unit 56A determines whether or not a reading timing of the identifier 46 is reached. In Step ST10, in a case where the reading timing of the identifier 46 is not reached, determination is made to be negative, and the determination of Step ST10 is performed again. In Step ST10, in a case where the reading timing of the identifier 46 is reached, determination is made to be affirmative, and the reading control processing proceeds to Step ST12.

In Step ST12, the acquisition unit 56A outputs a control signal for reading the reading condition information 68 stored in the cartridge memory 44 to the second noncontact reading and writing device 66. After the processing is executed in Step ST12, the reading control processing proceeds to Step ST14.

In Step ST14, the acquisition unit 56A acquires the reading condition information 68 output from the second noncontact reading and writing device 66. After the processing is executed in Step ST14, the reading control processing proceeds to Step ST16.

In Step ST16, the reading control unit 56B sets the optical condition in the barcode reader 64 based on the reading condition information 68 acquired by the acquisition unit 56A. After the processing is executed in Step ST16, the reading control processing proceeds to Step ST18.

In Step ST18, the reading control unit 56B acquires the identification information 69 output from the barcode reader 64. After the processing is executed in Step ST18, the reading control processing proceeds to Step ST20.

In Step ST20, the reading control unit 56B determines whether or not a condition (hereinafter, referred to as an "end condition") for ending the reading control processing is satisfied. An example of the end condition is a condition that an instruction to end the reading control processing is received by the reception device 16E of the host computer 16. In Step ST20, in a case where the end condition is not satisfied, determination is made to be negative, and the reading control processing proceeds to Step ST10. In Step ST20, in a case where the end condition is satisfied, determination is made to be affirmative, and the reading control processing ends.

As described above, in the cartridge management system 10 according to the first embodiment, the identifier 46 is displayed on the case 36 of the magnetic tape cartridge 20. The magnetic tape cartridge 20 is provided with the cartridge memory 44 in which the reading condition information 68 that is information regarding the reading condition for reading the identifier 46 is stored. The reading condition information 68 stored in the cartridge memory 44 is acquired to the acquisition unit 56A through the second noncontact reading and writing device 66. The reading control unit 56B makes the barcode reader 64 read the identifier 46 based on the reading condition information 68. Therefore, according to this configuration, accurate reading of the identifier 46 displayed on the magnetic tape cartridge 20 is realized. For example, accurate reading of the identifier 46 is realized, compared to a case where the identifier 46 is read while the reading condition information 68 is not taken into consideration.

In the cartridge management system 10 according to the first embodiment, the reading condition information 68 includes the optical condition information 68A that is information regarding the optical condition for optically reading the identifier 46. A condition for reading the identifier 46 is set in the barcode reader 64 based on the optical condition shown in the optical condition information 68A. In the barcode reader 64, the scanning light Ls emitted from the light source 64B is reflected in the barcode 46A, and the return light Lr is detected by the light receiving device 64A. For this reason, the optical condition (for example, the reading angle θ, the reflectance R, or an exposure time t) in the barcode reader 64 influences the reading accuracy of the barcode 46A. Therefore, according to this configuration, accurate reading of the identifier 46 displayed on the magnetic tape cartridge 20 is realized. For example, accurate reading of the identifier 46 is realized, compared to a case where the identifier 46 is read while the optical condition information 68A is not taken into consideration.

In the cartridge management system 10 according to the first embodiment, the optical condition information 68A includes the reflectance information 68A1 that is information regarding the reflectance R. A condition for reading the identifier 46 is set in the barcode reader 64 based on the optical condition shown in the reflectance information 68A1. For this reason, the reflectance R (for example, the maximum reflectance Rmax) in the barcode 46A influences the reading accuracy of the barcode 46A. Therefore, according to this configuration, accurate reading of the identifier 46 displayed on the magnetic tape cartridge 20 is realized. For example, accurate reading of the identifier 46 is realized, compared to a case where the identifier 46 is read while the reflectance information 68A1 is not taken into consideration.

In the cartridge management system 10 according to the first embodiment, the reflectance information 68A1 includes information indicating the relationship between the reflectance R and the reading angle θ. The reflectance R (for example, the maximum reflectance Rmax) is influenced by the reading angle θ. Therefore, according to this configuration, accurate reading of the identifier 46 is realized, compared to a case where the identifier 46 is read while the relationship between the reflectance R and the reading angle θ is not taken into consideration.

In the cartridge management system 10 according to the first embodiment, the reading condition information 68 is stored in the cartridge memory 44. Therefore, according to this configuration, it is possible to simplify the configuration of the magnetic tape cartridge 20, compared to a case where a storage medium for storing the reading condition information 68 is separately provided in the magnetic tape cartridge 20.

In the cartridge management system 10 according to the first embodiment, the identifier 46 displayed on the magnetic tape cartridge 20 includes the barcode 46A. Therefore, according to this configuration, the magnetic tape cartridge 20 is easily identified, compared to a case where the identifier 46 is composed only of the character string 46B.

In the cartridge management system 10 according to the first embodiment, the reading setting of the barcode reader 64 in a case of reading the barcode 46A is changed in the reading control unit 56B based on the reading condition information 68. Therefore, according to this configuration, accurate reading of the identifier 46 is realized, compared to a case where the reading setting in the barcode reader 64 is constantly the same.

Modification Example 1

In the above-described embodiment, although a form example where the optical condition information 68A includes the reflectance information 68A1 has been described, the technique of the present disclosure is not limited thereto. In Modification Example 1, the optical condition information 68A includes exposure time information 68A2 that is information regarding an exposure time t.

Figure 11:
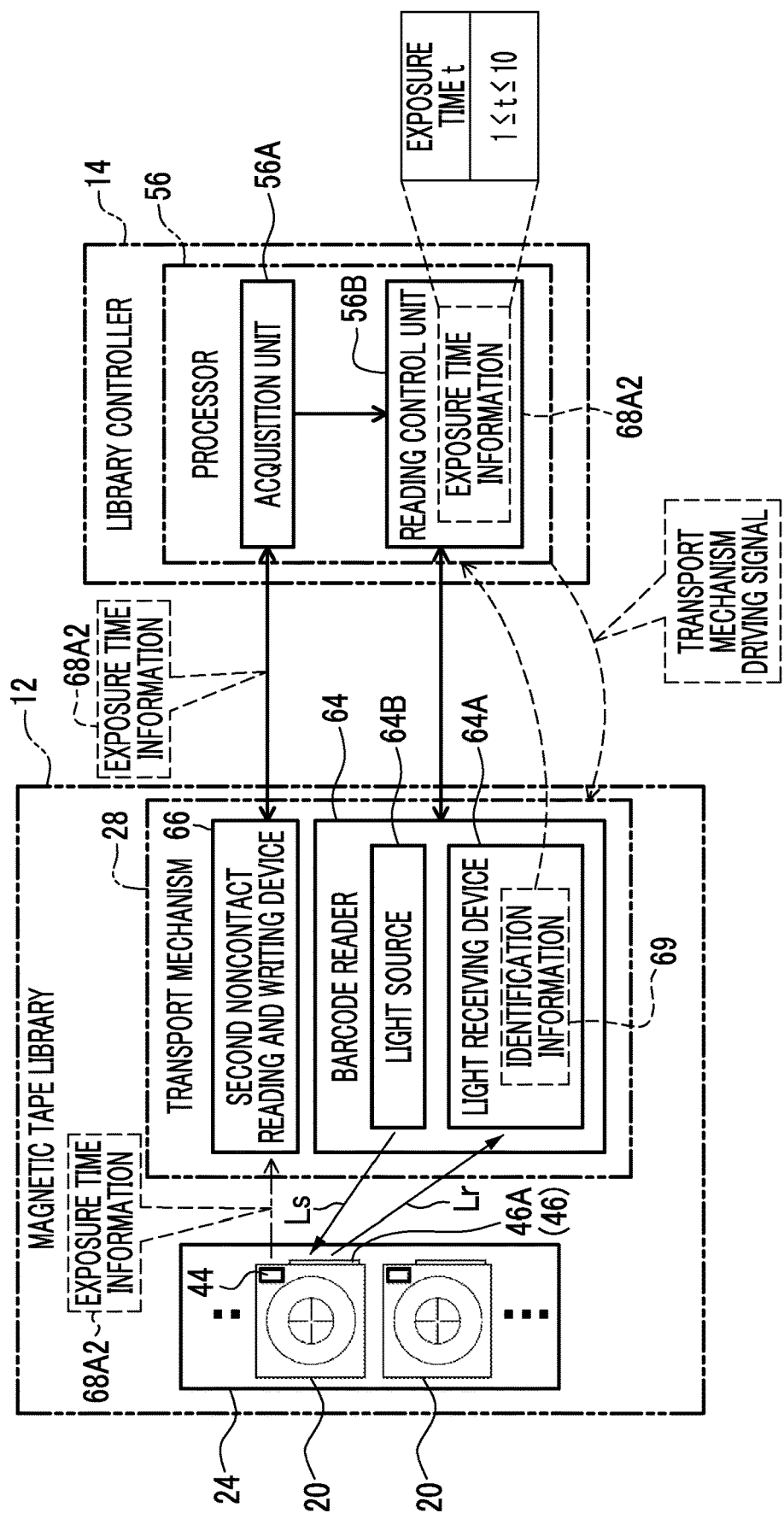
FIG. 11 is a conceptual diagram showing an example of a function of a library controller included in a cartridge management system according to Modification Example 1.

As shown in FIG. 11 as an example, first, the acquisition unit 56A acquires the exposure time information 68A2 from the cartridge memory 44 of the magnetic tape cartridge 20 by operating the second noncontact reading and writing device 66. The exposure time information 68A2 is stored in advance in the cartridge memory 44. The exposure time information 68A2 is information regarding the exposure time t in a case of reading the identifier 46. The exposure time information 68A2 is an example of "exposure time information" according to the technique of the present disclosure.

The second noncontact reading and writing device 66 outputs the exposure time information 68A2 read from the cartridge memory 44 to the acquisition unit 56A. The acquisition unit 56A outputs the acquired exposure time information 68A2 to the reading control unit 56B.

The reading control unit 56B controls the optical condition in the barcode reader 64 based on the exposure time information 68A2 acquired from the acquisition unit 56A. Here, in the exposure time information 68A2, information indicating a specified value of the exposure time t in the light receiving device 64A of the barcode reader 64 is included. In the example shown in FIG. 11, although information indicating a range of the exposure time t is shown as the exposure time information 68A2, this is merely an example. The exposure time information 68A2 may be information indicating an upper limit value of the exposure time t or may be information indicating a set value of the exposure time t. For example, the exposure time information 68A2 is obtained by a computer simulation and/or a test with a real machine.

The reading control unit 56B controls the optical condition in the barcode reader 64 based on the exposure time information 68A2. Specifically, the reading control unit 56B sets the exposure time t in the light receiving device 64A within the range of the exposure time t indicated by the exposure time information 68A2.

In a state in which the reading setting in the barcode reader 64 is changed, the barcode reader 64 reads the barcode 46A of the magnetic tape cartridge 20. The identification information 69 depending on a reading result of the barcode 46A is output from the barcode reader 64 to the processor 56 of the library controller 14.

The processor 56 outputs the transport mechanism driving signal to the transport mechanism 28 depending on the identification information 69. The transport mechanism 28 performs the loading operation in response to the transport mechanism driving signal. The magnetic tape drive 30 (see FIG. 4) selectively performs reading and writing of data on the surface of the magnetic tape MT (see FIG. 4) with respect to the loaded magnetic tape cartridge 20.

As described above, in the cartridge management system 10 according to the present modification example, the optical condition information 68A includes the exposure time information 68A2 that is information regarding the exposure time t in the light receiving device 64A. In the barcode reader 64, the return light Lr reflected in the barcode 46A is detected by the light receiving device 64A, so that the barcode 46A is read. For this reason, the exposure time t in the light receiving device 64A influences the reading accuracy of the barcode 46A. For example, in a case where the exposure time t exceeds the specified value, halation may occur. With this, reading of the barcode 46A is difficult. In this configuration, a condition for reading the identifier 46 is set in the barcode reader 64 based on the optical condition shown in the exposure time information 68A2. Therefore, according to this configuration, accurate reading of the identifier 46 displayed on the magnetic tape cartridge 20 is realized. For example, accurate reading of the identifier 46 is realized, compared to a case where the identifier 46 is read while the exposure time information 68A2 is not taken into consideration.

In the cartridge management system 10 according to the present modification example, the exposure time information 68A2 includes information indicating the specified value of the exposure time t. Therefore, according to this configuration, accurate reading of the identifier 46 is realized, compared to a case where the identifier 46 is read while the specified value of the exposure time t is not taken into consideration.

For example, in a case where the exposure time t exceeds the specified value, halation occurs, and reading of the barcode 46A is difficult. In the cartridge management system 10 according to the present modification example, since a condition for reading the identifier 46 is set based on the exposure time information 68A2 that is information indicating the specified value of the exposure time t, halation is suppressed. With this, accurate reading of the identifier 46 is realized.

Modification Example 2

In the above-described embodiment, although a form example where the optical condition information 68A includes the reflectance information 68A1 has been described, the technique of the present disclosure is not limited thereto. In Modification Example 2, the optical condition information 68A includes light source output information 68A3 that is information regarding an output (hereinafter, simply referred to as a "light source output P") of the light source 64B.

Figure 12:
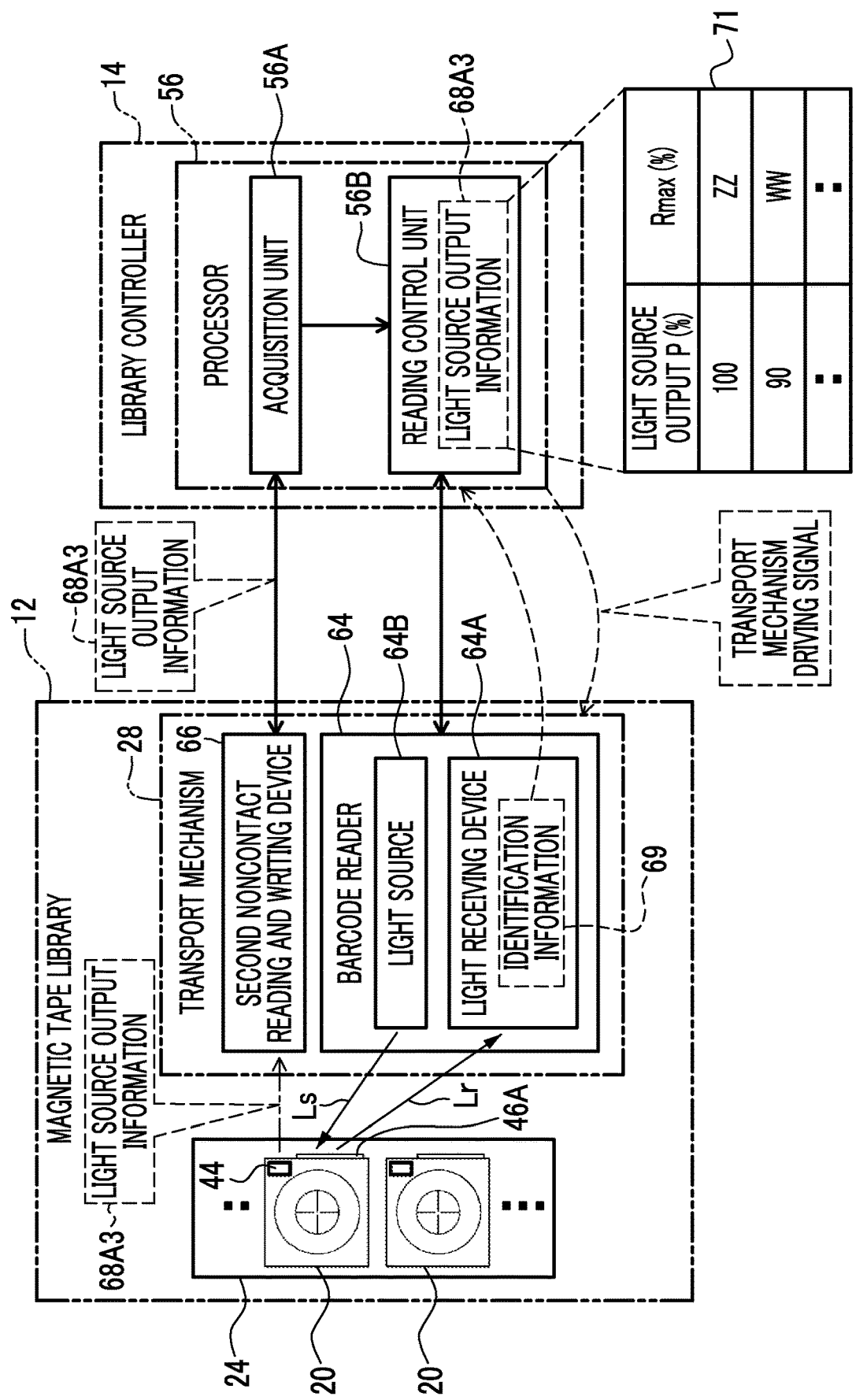
FIG. 12 is a conceptual diagram showing an example of a function of a library controller included in a cartridge management system according to Modification Example 2.

As shown in FIG. 12 as an example, first, the acquisition unit 56A acquires the light source output information 68A3 from the cartridge memory 44 of the magnetic tape cartridge 20 by operating the second noncontact reading and writing device 66. The light source output information 68A3 is stored in advance in the cartridge memory 44. The light source output information 68A3 is information regarding the light source output P in a case of reading the identifier 46. The light source output information 68A3 is an example of "light source output information" according to the technique of the present disclosure.

The second noncontact reading and writing device 66 outputs the light source output information 68A3 read from the cartridge memory 44 to the acquisition unit 56A. The acquisition unit 56A outputs the acquired light source output information 68A3 to the reading control unit 56B.

The reading control unit 56B controls the optical condition in the barcode reader 64 based on the light source output information 68A3 acquired from the acquisition unit 56A. Here, in the light source output information 68A3, information indicating a relationship between the maximum reflectance Rmax and the light source output P is included. In the example shown in FIG. 12, although a table 71 that shows the relationship between the light source output P and the maximum reflectance Rmax is shown as the light source output information 68A3, this is merely an example. The light source output information 68A3 may be an operational expression (not shown) having the maximum reflectance Rmax as a dependent variable and the light source output P as an independent variable. For example, the light source output information 68A3 is obtained by a computer simulation and/or a test with a real machine.

The reading control unit 56B controls the optical condition in the barcode reader 64 based on the light source output information 68A3. Specifically, the reading control unit 56B sets the light source output P such that the maximum reflectance Rmax is equal to or greater than a predetermined value (for example, 60%).

In a state in which the reading setting in the barcode reader 64 is changed, the barcode reader 64 reads the barcode 46A of the magnetic tape cartridge 20. The identification information 69 depending on a reading result of the barcode 46A is output from the barcode reader 64 to the processor 56 of the library controller 14.

The processor 56 outputs the transport mechanism driving signal to the transport mechanism 28 depending on the identification information 69. The transport mechanism 28 performs the loading operation in response to the transport mechanism driving signal. The magnetic tape drive 30 (see FIG. 4) selectively performs reading and writing of data on the surface of the magnetic tape MT (see FIG. 4) with respect to the loaded magnetic tape cartridge 20.

As described above, in the cartridge management system 10 according to the present modification example, the optical condition information 68A includes the light source output information 68A3 that is information regarding the light source output P. In the barcode reader 64, the return light Lr reflected in the barcode 46A is detected by the light receiving device 64A, so that the barcode 46A is read. For this reason, the reflectance R influences the reading accuracy of the barcode 46A. In addition, the reflectance R changes depending on the light source output P. In this configuration, a condition for reading the identifier 46 is set in the barcode reader 64 based on the optical condition shown in the light source output information 68A3. Therefore, according to this configuration, accurate reading of the identifier 46 displayed on the magnetic tape cartridge 20 is realized. For example, accurate reading of the identifier 46 is realized, compared to a case where the identifier 46 is read while light source output information 68A3 is not taken into consideration.

In the cartridge management system 10 according to the present modification example, the light source output information 68A3 includes information indicating the maximum reflectance Rmax depending on the light source output P. The maximum reflectance Rmax influences the reading accuracy of the barcode 46A. In addition, the maximum reflectance Rmax changes depending on the light source output P. Therefore, according to this configuration, accurate reading of the identifier 46 is realized, compared to a case where the identifier 46 is read while information indicating the maximum reflectance Rmax depending on the light source output P is not taken into consideration.

Modification Example 3

In the first embodiment and each modification example, although a form example where the optical condition information 68A respectively includes the reflectance information 68A1, the exposure time information 68A2, and the light source output information 68A3 has been described, the technique of the present disclosure is not limited thereto. In Modification Example 3, the optical condition information 68A includes all the reflectance information 68A1, the exposure time information 68A2, and the light source output information 68A3.

Figure 13:
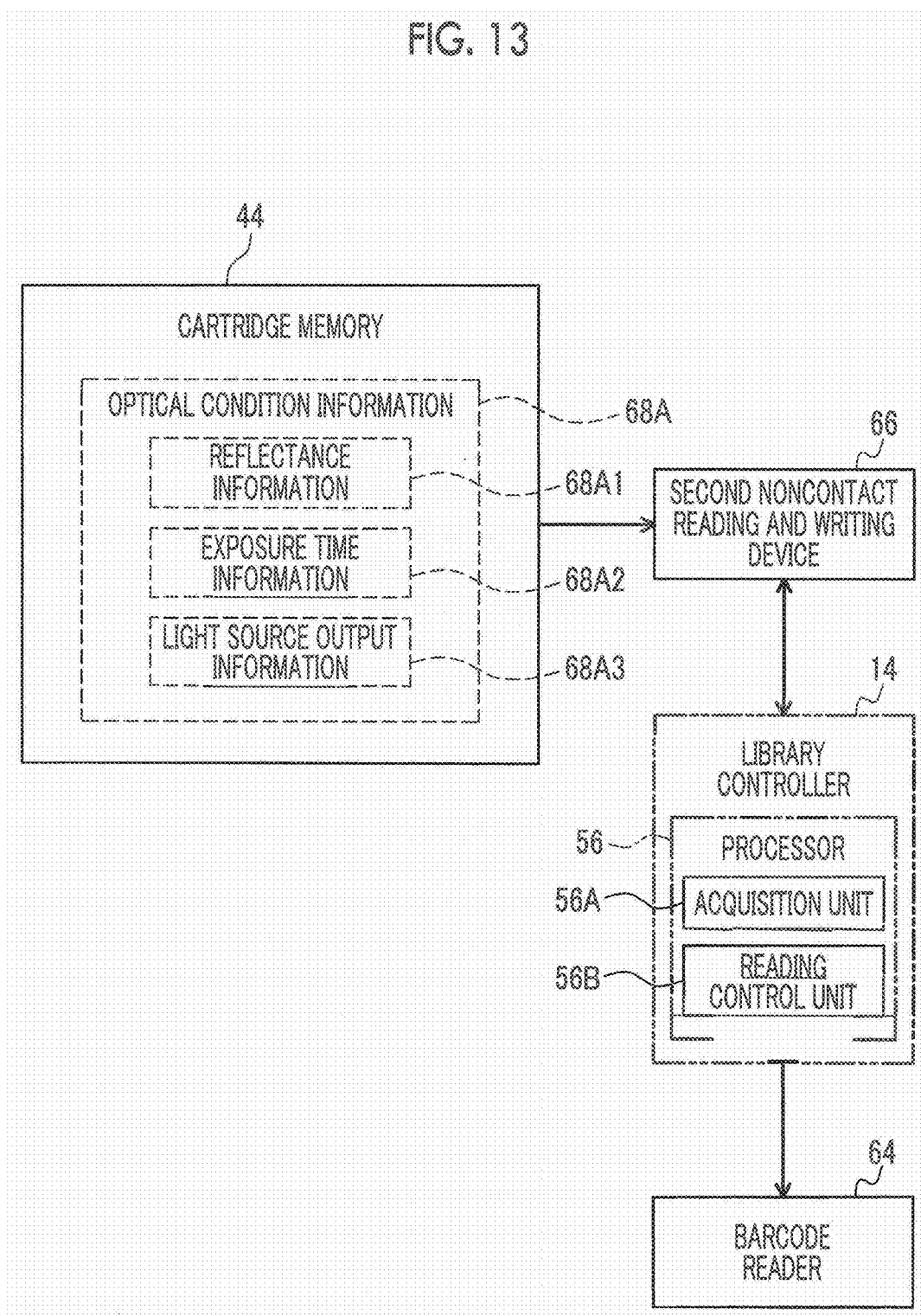
FIG. 13 is a conceptual diagram showing Modification Example 3 and is a conceptual diagram showing an example of an aspect where optical condition information is stored in a cartridge memory.

As shown in FIG. 13 as an example, in the cartridge memory 44, the reflectance information 68A1, the exposure time information 68A2, and the light source output information 68A3 are stored as the optical condition information 68A. The second noncontact reading and writing device 66 reads the optical condition information 68A from the cartridge memory 44 under the control of the acquisition unit 56A and outputs the read optical condition information 68A to the acquisition unit 56A. The reading control unit 56B sets the optical condition of the identifier 46 (see FIG. 3) in the barcode reader 64 based on the optical condition information 68A acquired by the acquisition unit 56A.

As described above, in the cartridge management system 10 according to the present modification example, the optical condition information 68A includes the reflectance information 68A1, the exposure time information 68A2, and the light source output information 68A3. The reading control unit 56B makes the barcode reader 64 read the identifier 46 based on the optical condition information 68A. Therefore, according to this configuration, accurate reading of the identifier 46 displayed on the magnetic tape cartridge 20 is realized.

In the present modification example, although a form example where the optical condition information 68A includes all the reflectance information 68A1, the exposure time information 68A2, and the light source output information 68A3 has been described, the technique of the present disclosure is not limited thereto. An aspect where the optical condition information 68A includes any two of the reflectance information 68A1, the exposure time information 68A2, and the light source output information 68A3 may be made.

Second Embodiment

In the first embodiment, although a form example where the reading condition information 68 includes the optical condition information 68A has been described, the technique of the present disclosure is not limited thereto. In a second embodiment, the reading condition information 68 includes label information 68B.

Figure 14:
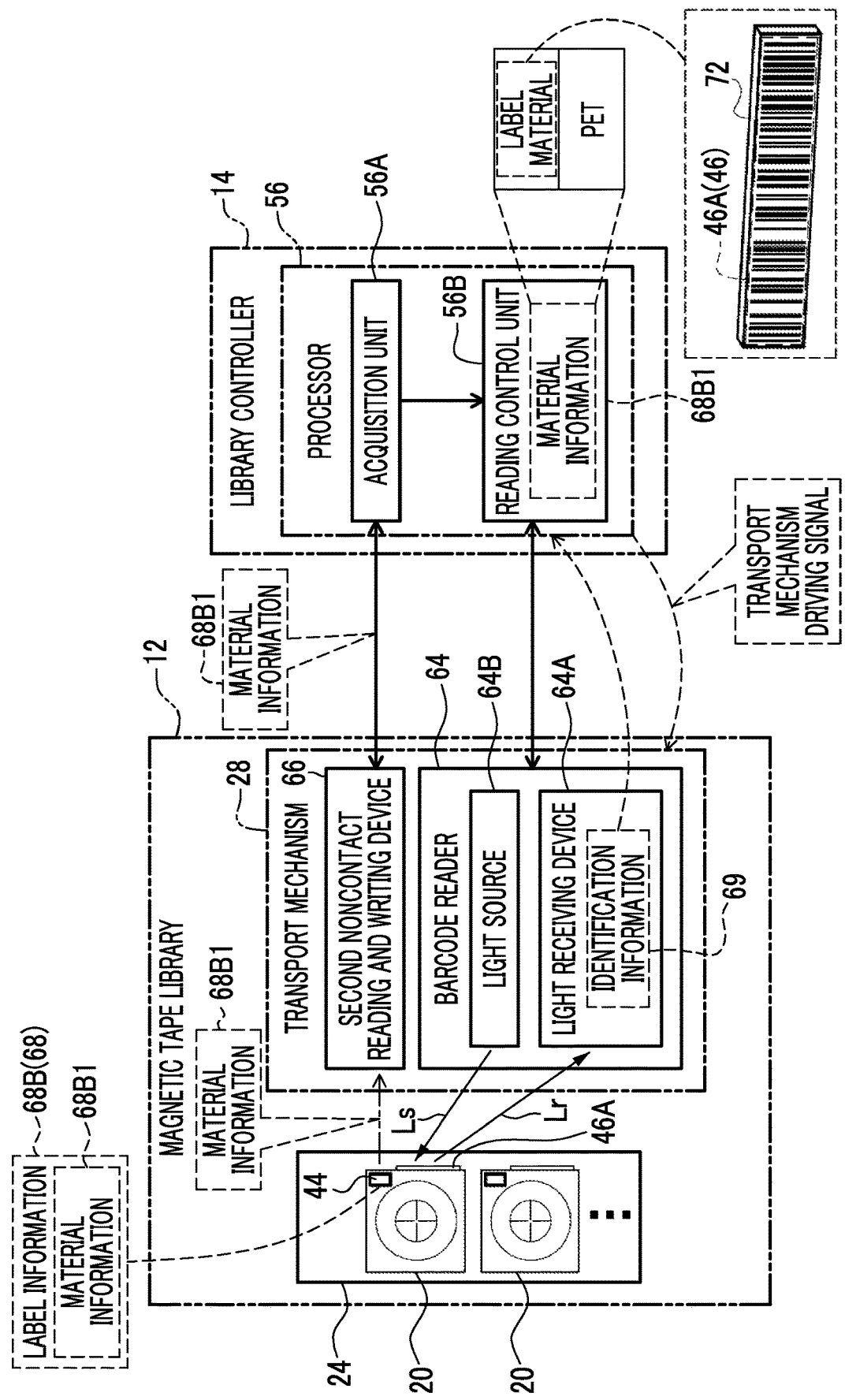
FIG. 14 is a conceptual diagram showing an example of a function of the library controller included in the cartridge management system according to the embodiment.

As shown in FIG. 14 as an example, the label information 68B is stored as the reading condition information 68 in the cartridge memory 44. The label information 68B is information regarding a label 72 on which the identifier 46 is printed. In the example shown in FIG. 14, material information 68B1 is stored as the label information 68B in the cartridge memory 44. The material information 68B1 is information indicating a material of the label 72. The label information 68B is an example of "label information" according to the technique of the present disclosure, and the material information 68B1 is an example of "material information" according to the technique of the present disclosure.

The acquisition unit 56A acquires the material information 68B1 from the cartridge memory 44 through the second noncontact reading and writing device 66. The reading control unit 56B controls the optical condition in the barcode reader 64 based on the material information 68B1 acquired from the acquisition unit 56A. In the example shown in FIG. 14, although an example where the material of the label 72 indicated by the material information 68B1 is PET, this is merely an example. The material of the label 72 may be, for example, resin other than PET or may be paper.

The reading control unit 56B controls the optical condition in the barcode reader 64 based on the material information 68B1. Specifically, the reading control unit 56B acquires a material table (not shown) in which an optical condition (for example, the output of the light source 64B) is determined depending on the material of the label 72, from the storage 58 (see FIG. 6). The reading control unit 56B sets the optical condition in the barcode reader 64 using the material table.

In a state in which the reading setting in the barcode reader 64 is changed, the barcode reader 64 reads the barcode 46A of the magnetic tape cartridge 20. The identification information 69 depending on a reading result of the barcode 46A is output from the barcode reader 64 to the processor 56 of the library controller 14.

The processor 56 outputs the transport mechanism driving signal to the transport mechanism 28 depending on the identification information 69. The transport mechanism 28 performs the loading operation in response to the transport mechanism driving signal. The magnetic tape drive 30 (see FIG. 4) selectively performs reading and writing of data on the surface of the magnetic tape MT (see FIG. 4) with respect to the loaded magnetic tape cartridge 20.

As described above, in the cartridge management system 10 according to the second embodiment, the reading condition information 68 includes the label information 68B that is information regarding the label 72 on which the identifier 46 is printed. In the barcode reader 64, the return light Lr reflected in the barcode 46A is detected by the light receiving device 64A. For this reason, the material quality (for example, material or surface state) of the barcode 46A influences the reading accuracy of the barcode 46A. In this configuration, a condition for reading the identifier 46 is set in the barcode reader 64 based on the label information 68B. Therefore, according to this configuration, accurate reading of the identifier 46 displayed on the magnetic tape cartridge 20 is realized. For example, accurate reading of the identifier 46 is realized, compared to a case where the identifier 46 is read while the label information 68B is not taken into consideration.

In the cartridge management system 10 according to the second embodiment, the label information 68B includes the material information 68B1 that is information indicating the material of the label 72. The material of the label 72 on which the barcode 46A is printed influences the reading accuracy of the barcode 46A. A condition for reading the identifier 46 is set in the barcode reader 64 based on the material information 68B1. Therefore, according to this configuration, accurate reading of the identifier 46 displayed on the magnetic tape cartridge 20 is realized. For example, accurate reading of the identifier 46 is realized, compared to a case where the identifier 46 is read while the material information 68B1 is not taken into consideration.

Modification Example 4

In the second embodiment, although a form example where the label information 68B includes the material information 68B1 has been described, the technique of the present disclosure is not limited thereto. In Modification Example 4, the label information 68B includes surface state information 68B2 that is information indicating a surface state of the label 72.

Figure 15:
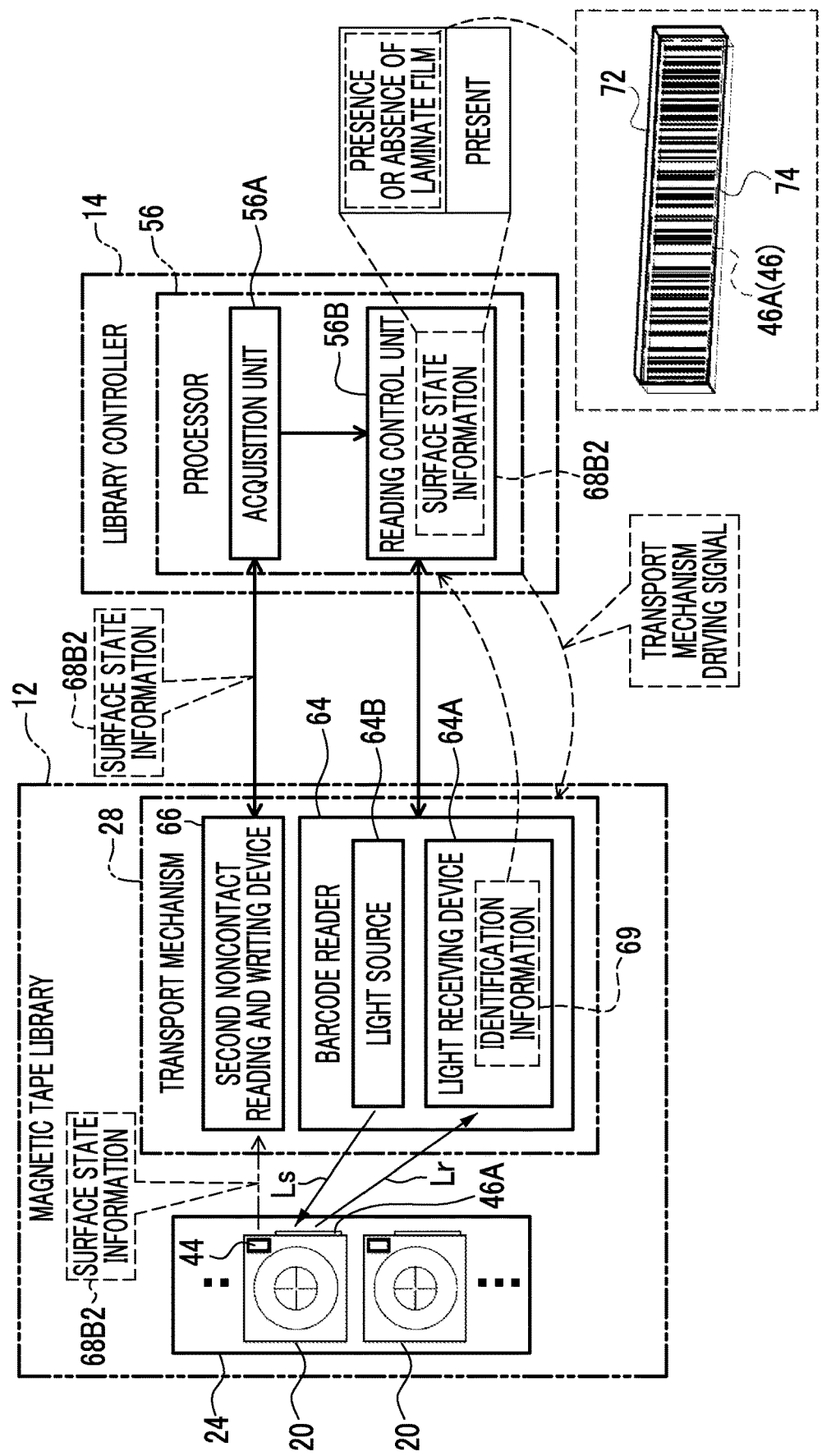
FIG. 15 is a conceptual diagram showing an example of a function of a library controller included in a cartridge management system according to Modification Example 4.

As shown in FIG. 15 as an example, the surface state information 68B2 is stored as the label information 68B in the cartridge memory 44. The surface state information 68B2 is information indicating the surface state of the label 72. The surface state information 68B2 is an example of "surface state information" according to the technique of the present disclosure.

The acquisition unit 56A acquires the surface state information 68B2 from the cartridge memory 44 through the second noncontact reading and writing device 66. The reading control unit 56B controls the optical condition in the barcode reader 64 based on the surface state information 68B2 acquired from the acquisition unit 56A. In the example shown in FIG. 15, although an example where the surface state of the label 72 indicated by the surface state information 68B2 is the presence or absence of a laminate film 74 has been shown, this is merely an example. The surface state indicated by the surface state information 68B2 may be surface roughness of the label 72 or may be glossiness of the label 72. The laminate film 74 is a film-shaped member formed of a material (for example, PET resin) that transmits the scanning light Ls. The laminate film 74 is stuck to a surface of the label 72 on which the barcode 46A is printed. The laminate film 74 is present, whereby reflection of the scanning light Ls emitted from the light source 64B is suppressed. The laminate film 74 is an example of a "laminate film" according to the technique of the present disclosure.

The reading control unit 56B controls the optical condition in the barcode reader 64 based on the surface state information 68B2. Specifically, the reading control unit 56B acquires a surface state table (not shown) in which an optical condition (for example, the light source output) is determined depending on the surface state of the label 72, from the storage 58 (see FIG. 6). The reading control unit 56B sets the optical condition in the barcode reader 64 using the surface state table. For example, in a case where the laminate film 74 is present on the surface of the label 72, the reading control unit 56B increases the light source output P, compared to a case where the laminate film 74 is absent.

In a state in which the reading setting in the barcode reader 64 is changed, the barcode reader 64 reads the barcode 46A of the magnetic tape cartridge 20. The identification information 69 depending on a reading result of the barcode 46A is output from the barcode reader 64 to the processor 56 of the library controller 14.

The processor 56 outputs the transport mechanism driving signal to the transport mechanism 28 depending on the identification information 69. The transport mechanism 28 performs the loading operation in response to the transport mechanism driving signal. The magnetic tape drive 30 (see FIG. 4) selectively performs reading and writing of data on the surface of the magnetic tape MT (see FIG. 4) with respect to the loaded magnetic tape cartridge 20.

As described above, in the cartridge management system 10 according to the present modification example, the label information 68B includes the surface state information 68B2 that is information indicating the surface state of the label 72. The surface state of the label 72 on which the barcode 46A is printed influences the reading accuracy of the barcode 46A. In this configuration, a condition for reading the identifier 46 is set in the barcode reader 64 based on the surface state information 68B2. Therefore, according to this configuration, accurate reading of the identifier 46 displayed on the magnetic tape cartridge 20 is realized. For example, accurate reading of the identifier 46 is realized, compared to a case where the identifier 46 is read while the surface state information 68B2 is not taken into consideration.

In the cartridge management system 10 according to the present modification example, the surface state information 68B2 is information indicating the presence or absence of the laminate film 74 on the surface of the label 72. The presence or absence of the laminate film 74 on the surface of the label 72 influences the reading accuracy of the barcode 46A. For example, in a case where the laminate film 74 made of PET resin is present, the reflectance R decreases, and reading of the barcode 46A is difficult. In this configuration, a condition for reading the identifier 46 is set in the barcode reader 64 based on information indicating the presence or absence of the laminate film 74. Therefore, according to this configuration, accurate reading of the identifier 46 displayed on the magnetic tape cartridge 20 is realized. For example, accurate reading of the identifier 46 is realized, compared to a case where the identifier 46 is read while the presence or absence of the laminate film 74 is not taken into consideration.

Modification Example 5

In the second embodiment and the modification example, although a form example where the label information 68B respectively includes the material information 68B1 and the surface state information 68B2 has been described, the technique of the present disclosure is not limited thereto. In Modification Example 5, the label information 68B includes both the material information 68B1 and the surface state information 68B2.

Figure 16:
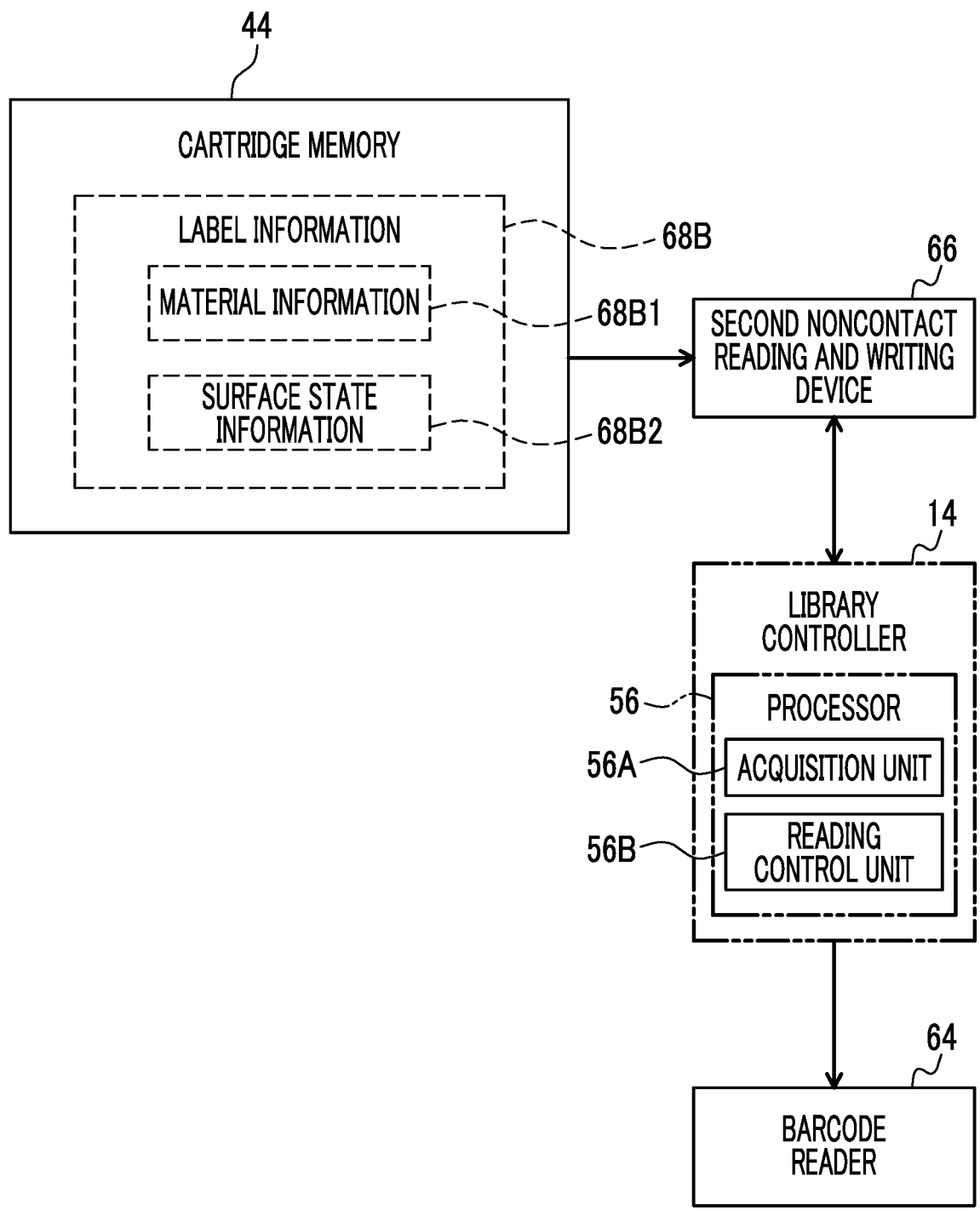
FIG. 16 is a conceptual diagram showing Modification Example 5 and is a conceptual diagram showing an example of an aspect where label information is stored in a cartridge memory.

As shown in FIG. 16 as an example, the material information 68B1 and the surface state information 68B2 are stored as the label information 68B in the cartridge memory 44. The second noncontact reading and writing device 66 reads the label information 68B from the cartridge memory 44 under the control of the acquisition unit 56A and outputs the read label information 68B to the acquisition unit 56A. The reading control unit 56B sets the optical condition of the identifier 46 (see FIG. 3) in the barcode reader 64 based on the label information 68B acquired by the acquisition unit 56A.

As described above, in the cartridge management system 10 according to the present modification example, the label information 68B includes the material information 68B1 and the surface state information 68B2. The reading control unit 56B makes the barcode reader 64 read the identifier 46 based on the label information 68B. Therefore, according to this configuration, accurate reading of the identifier 46 displayed on the magnetic tape cartridge 20 is realized. For example, accurate reading of the identifier 46 is realized, compared to a case where the identifier 46 is read while, as the label information 68B, the material information 68B1 and the surface state information 68B2 are not taken into consideration.

Modification Example 6

In each embodiment, although a form example where the reading condition information 68 includes any of the optical condition information 68A and the label information 68B has been described, the technique of the present disclosure is not limited thereto. In Modification Example 6, the reading condition information 68 includes both the optical condition information 68A and the label information 68B.

Figure 17:
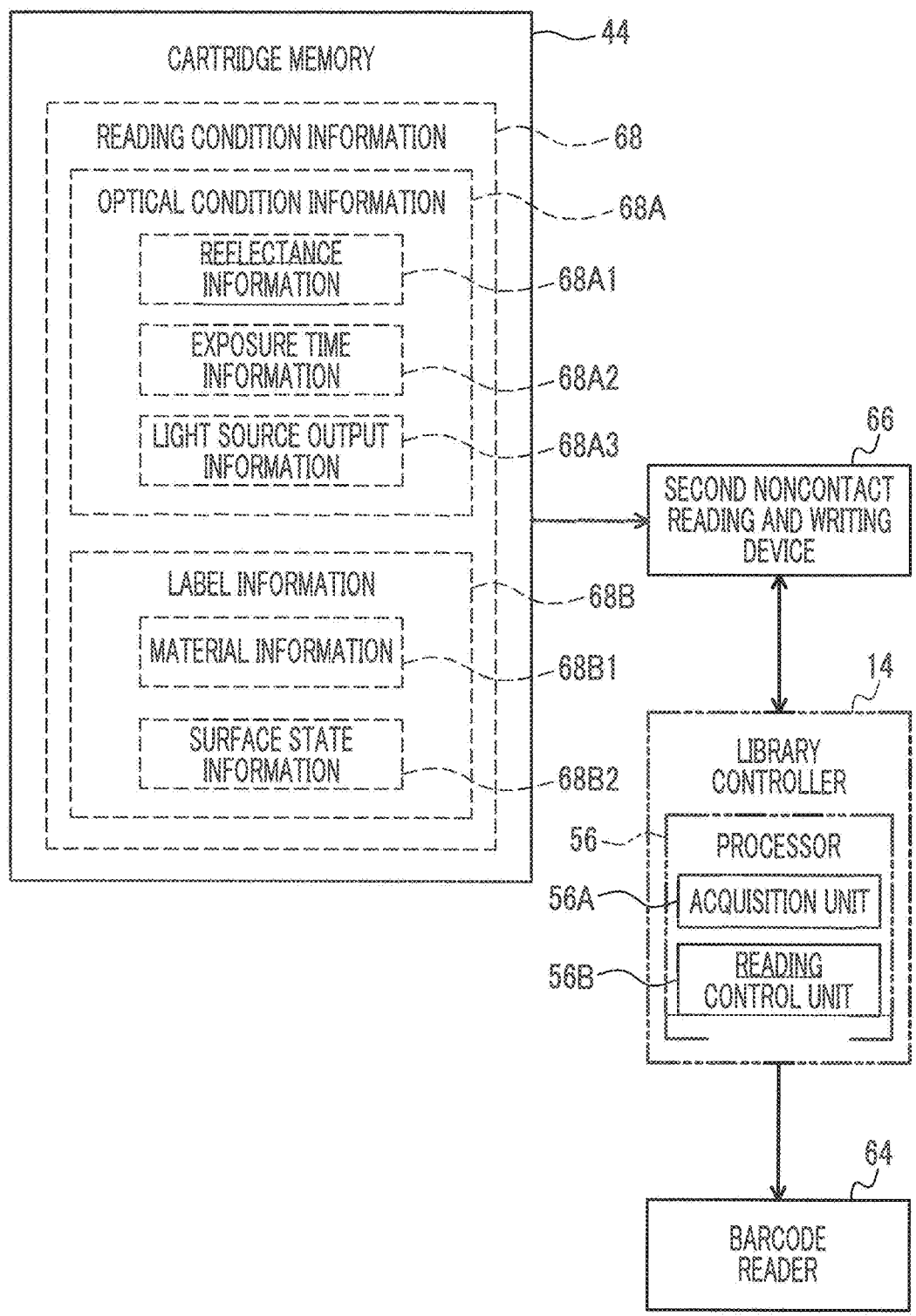
FIG. 17 is a conceptual diagram showing Modification Example 6 and is a conceptual diagram showing an example of an aspect where reading condition information is stored in a cartridge memory.

As shown in FIG. 17 as an example, the optical condition information 68A and the label information 68B are stored as the reading condition information 68 in the cartridge memory 44. The optical condition information 68A includes the reflectance information 68A1, the exposure time information 68A2, and the light source output information 68A3. The label information 68B includes the material information 68B1 and the surface state information 68B2. The second noncontact reading and writing device 66 reads the label information 68B from the cartridge memory 44 under the control of the acquisition unit 56A and outputs the read label information 68B to the acquisition unit 56A. The reading control unit 56B sets the optical condition of the identifier 46 (see FIG. 3) in the barcode reader 64 based on the label information 68B acquired by the acquisition unit 56A.

As described above, in the cartridge management system 10 according to the present modification example, the reading condition information 68 includes the optical condition information 68A and the label information 68B. The reading control unit 56B makes the barcode reader 64 read the identifier 46 based on the reading condition information 68. Therefore, according to this configuration, accurate reading of the identifier 46 displayed on the magnetic tape cartridge 20 is realized. For example, accurate reading of the identifier 46 is realized, compared to a case where the identifier 46 is read while, as the reading condition information 68, the optical condition information 68A and the label information 68B are not taken into consideration.

Modification Example 7

In each embodiment, although a form example where the barcode 46A is displayed as the identifier 46 has been described, the technique of the present disclosure is not limited thereto. In Modification Example 7, as the identifier 46, a two-dimensional matrix image 46C is displayed instead of the barcode 46A.

Figure 18:
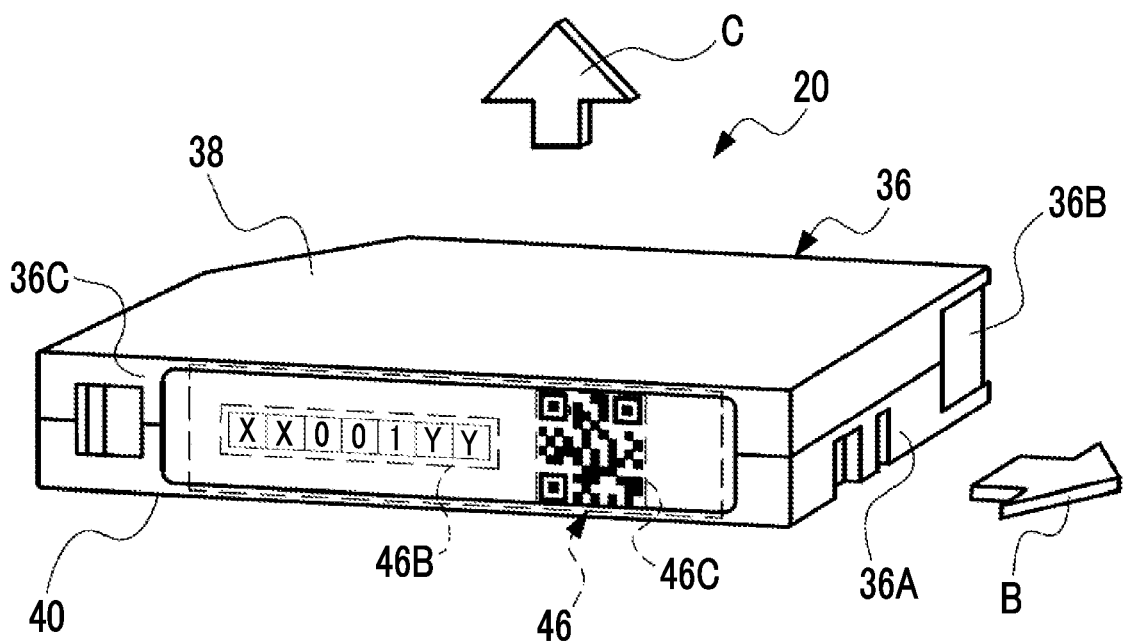
FIG. 18 is a schematic perspective view showing an example of an identifier displayed on a magnetic tape cartridge according to Modification Example 7.

As shown in FIG. 18 as an example, the identifier 46 is displayed on the surface of the case 36 of the magnetic tape cartridge 20. In the example shown in FIG. 18, the identifier 46 is displayed on the surface of the rear wall 36C of the case 36. The identifier 46 includes the two-dimensional matrix image 46C. The two-dimensional matrix image 46C is a two-dimensional image indicating information for identifying the magnetic tape cartridge 20 (for example, a serial number for managing the magnetic tape cartridge 20, given by the user). The two-dimensional matrix image 46C is an example of a "two-dimensional matrix image" according to the technique of the present disclosure.

As described above, in the cartridge management system 10 according to the present modification example, the identifier 46 includes the two-dimensional matrix image 46C. Therefore, according to this configuration, the magnetic tape cartridge 20 is easily identified. For example, the magnetic tape cartridge 20 is easily identified, compared to a case where the identifier 46 is composed only of a character string.

In the present modification example, although a form example where the identifier 46 includes the two-dimensional matrix image 46C has been described, the technique of the present disclosure is not limited thereto. For example, an aspect where the identifier 46 includes the barcode 46A along with the two-dimensional matrix image 46C may be made. Alternatively, an aspect where the identifier 46 includes a dot code instead of the two-dimensional matrix image 46C and the barcode 46A or along with the two-dimensional matrix image 46C and the barcode 46A may be made.

In each embodiment, although a form example where the cartridge management system 10 comprises the magnetic tape library 12, the library controller 14, and the host computer 16 has been described, the technique of the present disclosure is not limited thereto. An aspect where the magnetic tape library 12 is controlled by one external control device having the same functions as the host computer 16 and the library controller 14 may be made. An aspect where the magnetic tape library 12 comprises one control device having the same functions as the host computer 16 and the library controller 14 may be made.

In each embodiment, although a form example where the reading control processing program 58A is stored in the storage 58 has been described, the technique of the present disclosure is not limited thereto. For example, the reading control processing program 58A may be stored in a portable storage medium, such as an SSD or a USB memory. The storage medium is a non-transitory computer readable storage medium. The reading control processing program 58A that is stored in the storage medium is installed on the computer 15 of the library controller 14. The processor 56 executes the reading control processing following the reading control processing program 58A.

In each embodiment, although the computer 15 is illustrated, the technique of the present disclosure is not limited thereto, and a device including an ASIC, an FPGA, and/or a PLD may be applied instead of the computer 15. A combination of a hardware configuration and a software configuration may be used instead of the computer 15.

As the hardware resource that executes the reading control processing described in each embodiment described above, various processors described below can be used. Examples of the processors include a CPU that is a general-purpose processor configured to execute software, that is, a program to function as the hardware resource that executes the reading control processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor executes the reading control processing using the memory.

The hardware resource that executes the reading control processing may be configured with one of various processors or may be configured with a combination of two or more processors (for example, a combination of a plurality of FPGAs or a combination of a CPU and an FPGA) of the same type or different types. The hardware resource that executes the reading control processing may be one processor.

As an example where the hardware resource is configured with one processor, first, there is a form in which one processor is configured with a combination of one or more CPUs and software, and the processor functions as the hardware resource that executes the reading control processing. Second, as represented by SoC or the like, there is a form in which a processor that realizes the functions of the entire system including a plurality of hardware resources for executing the reading control processing in one IC chip is used. In this way, the reading control processing is realized using one or more of various processors described above as the hardware resource.

In addition, as the hardware structure of various processors, more specifically, an electric circuit into which circuit elements, such as semiconductor elements, are combined can be used. The above-described estimation processing is merely an example. Therefore, it is needless to say that unnecessary steps may be deleted, new steps may be added, or a processing order may be rearranged without departing from the spirit and scope of the present disclosure.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or portions may be replaced in the above-described contents and the illustrated contents without departing from the spirit and scope of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A magnetic tape cartridge comprising:
a case on which an identifier is displayed; and
a storage medium in which reading condition information that is information regarding a condition for reading the identifier is stored.

2. The magnetic tape cartridge according to claim 1,
wherein the reading condition information includes optical condition information that is information regarding an optical condition for optically reading the identifier and/or label information that is information regarding a label on which the identifier is printed.

3. The magnetic tape cartridge according to claim 2,
wherein the optical condition information includes at least one of reflectance information that is information regarding reflectance, light source output information that is information regarding an output of a light source, or exposure time information that is information regarding an exposure time.

4. The magnetic tape cartridge according to claim 3,
wherein the reflectance information includes information indicating a relationship between the reflectance and a reading angle.

5. The magnetic tape cartridge according to claim 3,
wherein the exposure time information includes information indicating a specified value of the exposure time.

6. The magnetic tape cartridge according to claim 3,
wherein the light source output information includes information indicating the reflectance depending on the output of the light source.

7. The magnetic tape cartridge according to claim 2,
wherein the label information includes material information indicating a material of the label.

8. The magnetic tape cartridge according to claim 2,
wherein the label information includes surface state information that is information regarding a surface state of the label.

9. The magnetic tape cartridge according to claim 8,
wherein the surface state information includes information indicating presence or absence of a laminate film on a surface of the label.

10. The magnetic tape cartridge according to claim 1,
wherein the storage medium is a cartridge memory.

11. The magnetic tape cartridge according to claim 1,
wherein the identifier includes a one-dimensional image and/or a two-dimensional matrix image.

12. A cartridge management system that is applied to the magnetic tape cartridge according to claim 1, the cartridge management system comprising:
a processor; and
a reading device that reads the identifier,
wherein the processor is configured to
acquire the reading condition information stored in the storage medium, and
make the reading device read the identifier based on the reading condition information.

13. The cartridge management system according to claim 12,
   wherein the processor is configured to change a reading setting of the reading device in a case of reading the identifier, based on the reading condition information.

14. A reading method comprising:
   acquiring the reading condition information that is stored in the storage medium of the magnetic tape cartridge according to claim 1, and that is the information regarding the condition for reading the identifier displayed on the case of the magnetic tape cartridge; and
   reading the identifier based on the reading condition information.

15. A non-transitory storage medium storing a program that causes a computer to execute a process, the process comprising
   acquiring the reading condition information that is stored in the storage medium of the magnetic tape cartridge according to claim 1, and that is the information regarding the condition for reading the identifier displayed on the case of the magnetic tape cartridge; and
   reading the identifier based on the reading condition information.

* * * * *